(12) United States Patent
Sinha et al.

(10) Patent No.: US 11,811,623 B2
(45) Date of Patent: Nov. 7, 2023

(54) DEEP TRACING OF USER EXPERIENCE

(71) Applicant: Zscaler, Inc., San Jose, CA (US)

(72) Inventors: Amit Sinha, San Jose, CA (US); Srikanth Devarajan, Cupertino, CA (US); Chakkaravarthy Periyasamy Balaiah, San Jose, CA (US); Khaireddine Mazboudi, San Jose, CA (US); Sandeep Kamath Voderbet, Sunnyvale, CA (US); Sushil Pangeni, Fremont, CA (US); Pratap Ramachandra, Bangalore (IN); Amber Wu, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 0 days.

(21) Appl. No.: 17/527,552

(22) Filed: Nov. 16, 2021

(65) Prior Publication Data

US 2022/0078090 A1  Mar. 10, 2022

Related U.S. Application Data

(63) Continuation-in-part of application No. 16/798,952, filed on Feb. 24, 2020, which is a continuation-in-part of application No. 16/284,073, filed on Feb. 25, 2019, now Pat. No. 10,892,964, and a continuation-in-part of application No. 16/284,106, filed on Feb. 25, 2019, now Pat. No. 10,938,686, and a continuation-in-part of application No. 16/284,202, filed on Feb. 25, 2019, now Pat. No. 10,728,117, application No. 17/527,552 is a continuation-in-part of application No. 16/940,549, filed on Jul. 28, 2020, which is a continuation of application No. 15/377,051, filed on Dec. 13, 2016, now Pat. No. 10,728,113.

(51) Int. Cl.
*H04L 41/5009* (2022.01)
*H04L 43/10* (2022.01)
*H04L 41/5067* (2022.01)
*H04L 41/0654* (2022.01)

(52) U.S. Cl.
CPC ...... *H04L 41/5009* (2013.01); *H04L 41/5067* (2013.01); *H04L 43/10* (2013.01); *H04L 41/0654* (2013.01)

(58) Field of Classification Search
CPC . H04L 41/5009; H04L 41/5067; H04L 43/10; H04L 41/0654
USPC ........................................................ 709/224
See application file for complete search history.

(56) References Cited

U.S. PATENT DOCUMENTS

| 7,756,826 B2 | 7/2010 | Bots et al. |
| 8,259,571 B1 | 9/2012 | Raphel et al. |
| 8,429,111 B1 | 4/2013 | Kailash et al. |
| 8,458,789 B1 | 6/2013 | Kailash et al. |

(Continued)

*Primary Examiner* — Hermon Asres
(74) *Attorney, Agent, or Firm* — Baratta Law PLLC; Lawrence A. Baratta, Jr.; Ryan Odessa

(57) ABSTRACT

Techniques for deep tracing of one or more users via a cloud-based system include receiving a request from an administrator to actively troubleshoot a user; causing a user device associated with the user to create a deep tracing session based on the request; assisting the user device in performing one or more traces of a plurality of traces to a destination; receiving results from any of the plurality of traces and results from metrics collected at the user device; and displaying a network map between the user device and the destination.

19 Claims, 32 Drawing Sheets

(56) References Cited

U.S. PATENT DOCUMENTS

| | | |
|---|---|---|
| 8,464,335 B1 | 6/2013 | Sinha et al. |
| 8,495,737 B2 | 7/2013 | Sinha et al. |
| 8,887,249 B1 | 11/2014 | Schekochikhin et al. |
| 8,955,091 B2 | 2/2015 | Kailash et al. |
| 9,060,239 B1 | 6/2015 | Sinha et al. |
| 9,369,433 B1 | 6/2016 | Paul et al. |
| 9,473,537 B2 | 10/2016 | Sinha et al. |
| 9,569,195 B2 | 2/2017 | Schekochikhin et al. |
| 9,654,507 B2 | 5/2017 | Gangadharappa et al. |
| 10,007,699 B2 | 6/2018 | Pangeni et al. |
| 2009/0300045 A1 | 12/2009 | Chaudhry et al. |
| 2010/0125903 A1 | 5/2010 | Devarajan et al. |
| 2010/0175134 A1 | 7/2010 | Ali-Ahmad et al. |
| 2011/0167474 A1 | 7/2011 | Sinha et al. |
| 2011/0277027 A1 | 11/2011 | Hayton et al. |
| 2012/0304244 A1 | 11/2012 | Xie et al. |
| 2013/0291087 A1 | 10/2013 | Kailash et al. |
| 2013/0311832 A1 | 11/2013 | Lad et al. |
| 2014/0026179 A1 | 1/2014 | Devarajan et al. |
| 2014/0105038 A1* | 4/2014 | Yu .................... H04L 41/12 370/252 |
| 2015/0195291 A1 | 7/2015 | Zuk et al. |
| 2015/0326613 A1 | 11/2015 | Devarajan et al. |
| 2016/0048558 A1 | 2/2016 | Kailash et al. |
| 2017/0090760 A1 | 3/2017 | Kalipatnapu et al. |
| 2017/0142068 A1 | 5/2017 | Devarajan et al. |
| 2017/0210731 A1 | 7/2017 | Kumar et al. |
| 2017/0223029 A1 | 8/2017 | Sharma et al. |
| 2017/0250887 A1 | 8/2017 | Sadana et al. |
| 2017/0315902 A1 | 11/2017 | Moretto et al. |
| 2017/0366421 A1* | 12/2017 | Dam .................. H04L 43/045 |
| 2018/0115463 A1 | 4/2018 | Sinha et al. |
| 2022/0193558 A1* | 6/2022 | Larson ................ A63F 13/355 |

* cited by examiner

DEEP TRACING OF USER EXPERIENCE

CROSS-REFERENCE TO RELATED APPLICATIONS

The present disclosure is a continuation-in-part of U.S. patent application Ser. No. 16/798,952, filed Feb. 24, 2020, and U.S. patent application Ser. No. 16/798,952 is a continuation-in-part of: 1) U.S. patent application Ser. No. 16/284,073, filed Feb. 25, 2019, which is now U.S. Pat. No. 10,892,964, issued Jan. 12, 2021, 2) U.S. patent application Ser. No. 16/284,106, filed Feb. 25, 2019, which is now U.S. Pat. No. 10,938,686, issued Mar. 2, 2021, and 3) U.S. patent application Ser. No. 16/284,202, filed Feb. 25, 2019, which is now U.S. Pat. No. 10,728,117, issued Jul. 28, 2020, the contents of each are incorporated by reference in their entirety.

The present disclosure is also a continuation-in-part of U.S. patent application Ser. No. 16/940,549, filed Jul. 28, 2020, and U.S. patent application Ser. No. 16/940,549 is a continuation of U.S. patent application Ser. No. 15/377,051, filed Dec. 13, 2016, which is now U.S. Pat. No. 10,728,113, issued Jul. 28, 2020, and which claimed priority to Indian Patent Application No. 201611036718, filed Oct. 26, 2016, the contents of each are incorporated by reference in their entirety.

FIELD OF THE DISCLOSURE

The present disclosure relates generally to networking and computing. More particularly, the present disclosure relates to systems and methods for deep tracing for troubleshooting of digital user experience.

BACKGROUND OF THE DISCLOSURE

The trend in Information Technology (IT) includes applications and resources being located in the cloud, users working from home or anywhere, and for the Internet becoming the new corporate network. As such, there is a need for IT to monitor and isolate issues affecting the user-to-cloud application experience. That is, there is a need for IT administrators to have visibility into the network and details of service paths. Generally, User Experience (UX or UEX) seeks to quantify an individual user's satisfaction with a product or service such as a networking application. In networking, End User Experience Monitoring (EUEM) tools conventionally focus on observations, i.e., tests, instead of monitoring, i.e., continuous feedback. For example, conventional EUEM tools focus on page load and response time over Hypertext Transfer Protocol (HTTP). While this approach can provide insight, there are limitations as these measurements may vary by time of day, location, etc., provide little input into remedial actions, are reactive and merely snapshots in time, etc. Network Performance Monitoring and Diagnostics Market (NPMD) tools allow for Information Technology (IT) operations to understand the performance of applications, the network and infrastructure components via network instrumentation. Additionally, these tools provide insight into the quality of end user experience. The goal of NPMD products is not only to monitor the network components to facilitate outage and degradation resolution but also to identify performance optimization opportunities. This is conducted via diagnostics, analytics, and debugging capabilities to complement additional monitoring of today's complex IT environments. Application Performance Monitoring (APM) is the monitoring and management of performance and availability of software applications. APM strives to detect and diagnose complex application performance problems to maintain an expected level of service.

Digital Experience Monitoring (DEM) goes beyond APM and EUEM. EUEM looks specifically at the human end-user or customer interaction with an application. APM focuses on the performance and availability of the application. DEM is the experience of all digital agents—human and machine—as they interact with enterprises' application and service portfolios. A problem with conventional DEM is the inability to obtain end-to-end data. Conventional DEM dataset sources include lightweight instrumentation of devices and endpoints, JavaScript injected web pages (Server side), network-extracted packets and flows (client side), synthetic transaction executions, Application Programming Interfaces (APIs) and social media feeds, etc. The lightweight instrumentation can include Web-page-injected snippets such as JavaScript code acting as mini-agents that capture and send data from an endpoint once a Web page has been rendered. Packet capture applications can include both custom hardware and software-based components that capture packets from the network and interpret protocol information. Operating System (OS)-resident agents can capture and send data directly from the endpoint or device. Synthetic transactions can be run as tests to obtain results for applications, services, or digital business processes. Finally, social-media-based information (including sentiment data), collective intelligence benchmarking, and API data feeds are being added to the DEM ingestion level.

Disadvantageously, the above approaches for data gathering for DEM are all reactive in the sense these techniques are implemented periodically or on demand.

BRIEF SUMMARY OF THE DISCLOSURE

The present disclosure relates to systems and methods for deep tracing for troubleshooting of digital user experience. In various embodiments, the present disclosure includes a method having steps, a system including at least one processor and memory with instructions that, when executed, cause the at least one processor to implement the steps, and a non-transitory computer-readable medium having instructions stored thereon for programming at least one processor to perform the steps. Techniques for deep tracing of one or more users via a cloud-based system include receiving a request from an administrator to actively troubleshoot a user; causing a user device associated with the user to create a deep tracing session based on the request; assisting the user device in performing one or more traces of a plurality of traces to a destination; receiving results from any of the plurality of traces and results from metrics collected at the user device; and displaying a network map between the user device and the destination.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server that may be used in the cloud-based system of FIGS. 1 and 2 or the like.

FIG. 4 is a block diagram of a user device that may be used with the cloud-based system of FIGS. 1 and 2 or the like.

FIG. 11 is a network diagram of a trace between a user and a destination with no tunnel in between.

FIG. 29 is results from the example implementation of the MTR of FIG. 28;

FIG. 30 is results from the example implementation of the webload of FIG. 29.

FIGS. 32-35 are screenshots associated with the deep tracing.

DETAILED DESCRIPTION OF THE DISCLOSURE

The present disclosure relates to systems and methods for deep tracing of digital user experience. Techniques for deep tracing of one or more users via a cloud-based system include receiving a request from an administrator to actively troubleshoot a user; causing a user device associated with the user to create a deep tracing session based on the request; assisting the user device in performing one or more traces of a plurality of traces to a destination; receiving results from any of the plurality of traces and results from metrics collected at the user device; and displaying a network map between the user device and the destination.

§ 1.0 Example Cloud-Based System Architecture

Figure 1:
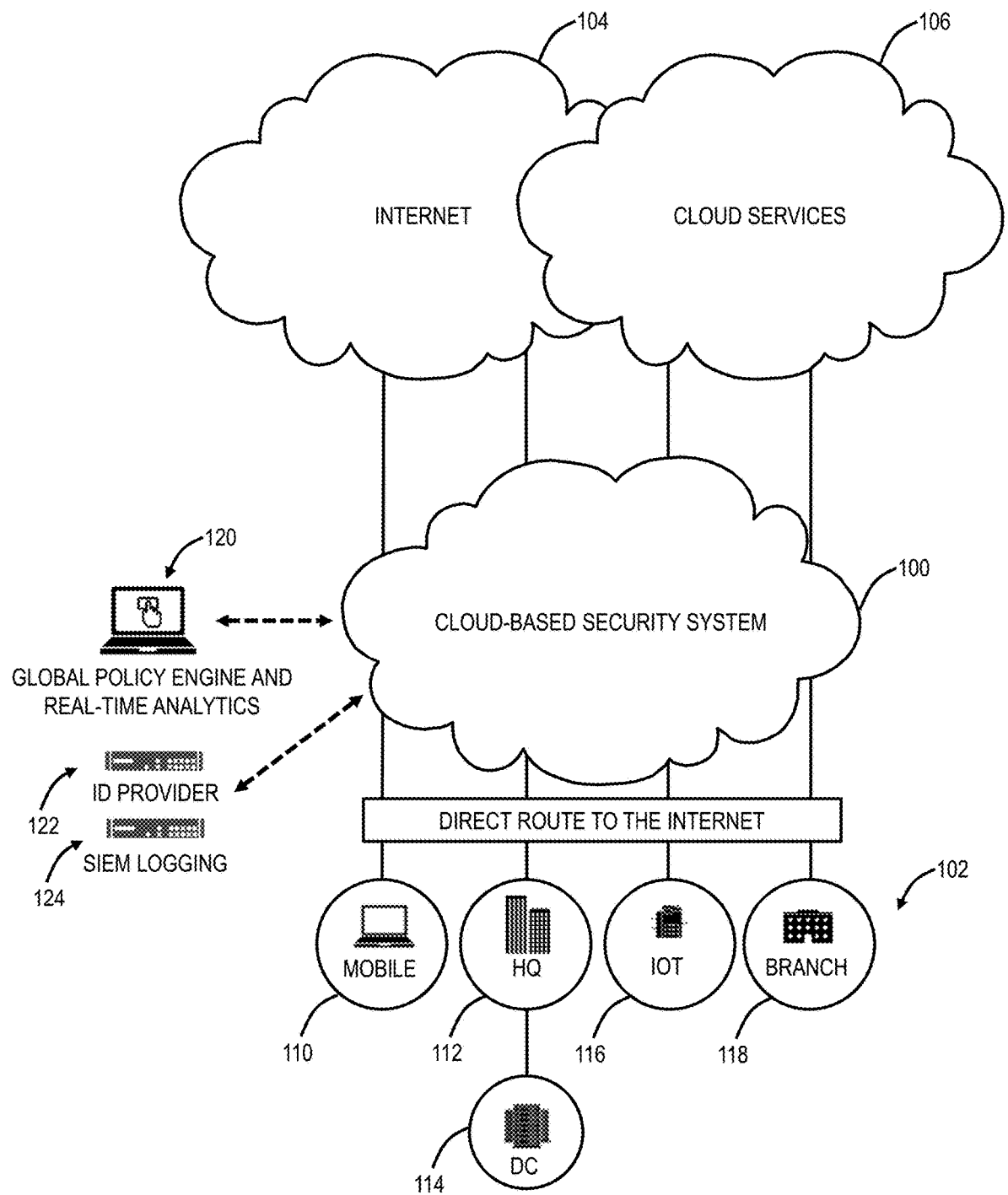
FIG. 1 is a network diagram of a cloud-based system offering security as a service.

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
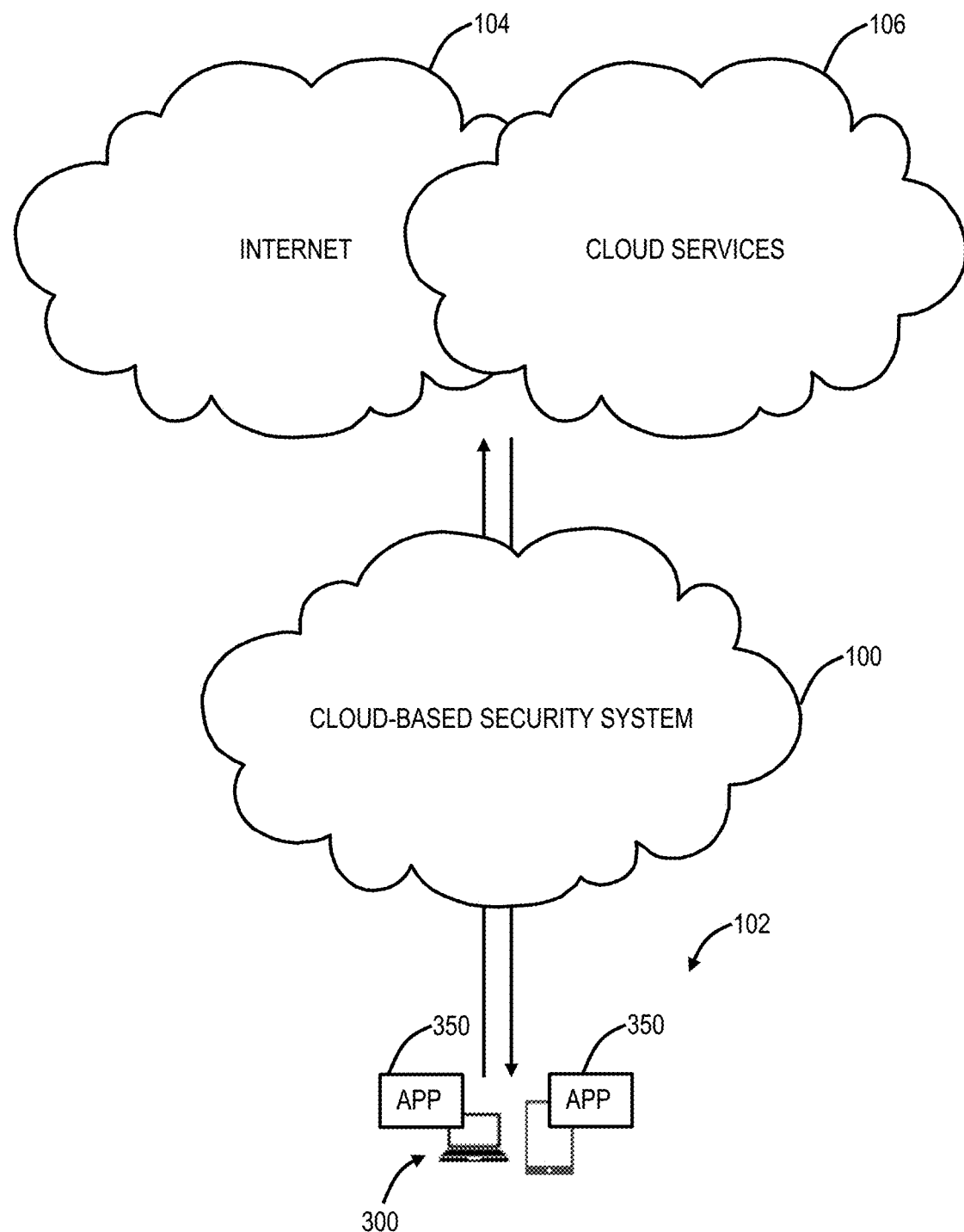
FIG. 5 is a network diagram of the cloud-based system illustrating an application on user devices with users configured to operate through the cloud-based system.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as GRE, L2TP, IPsec, customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
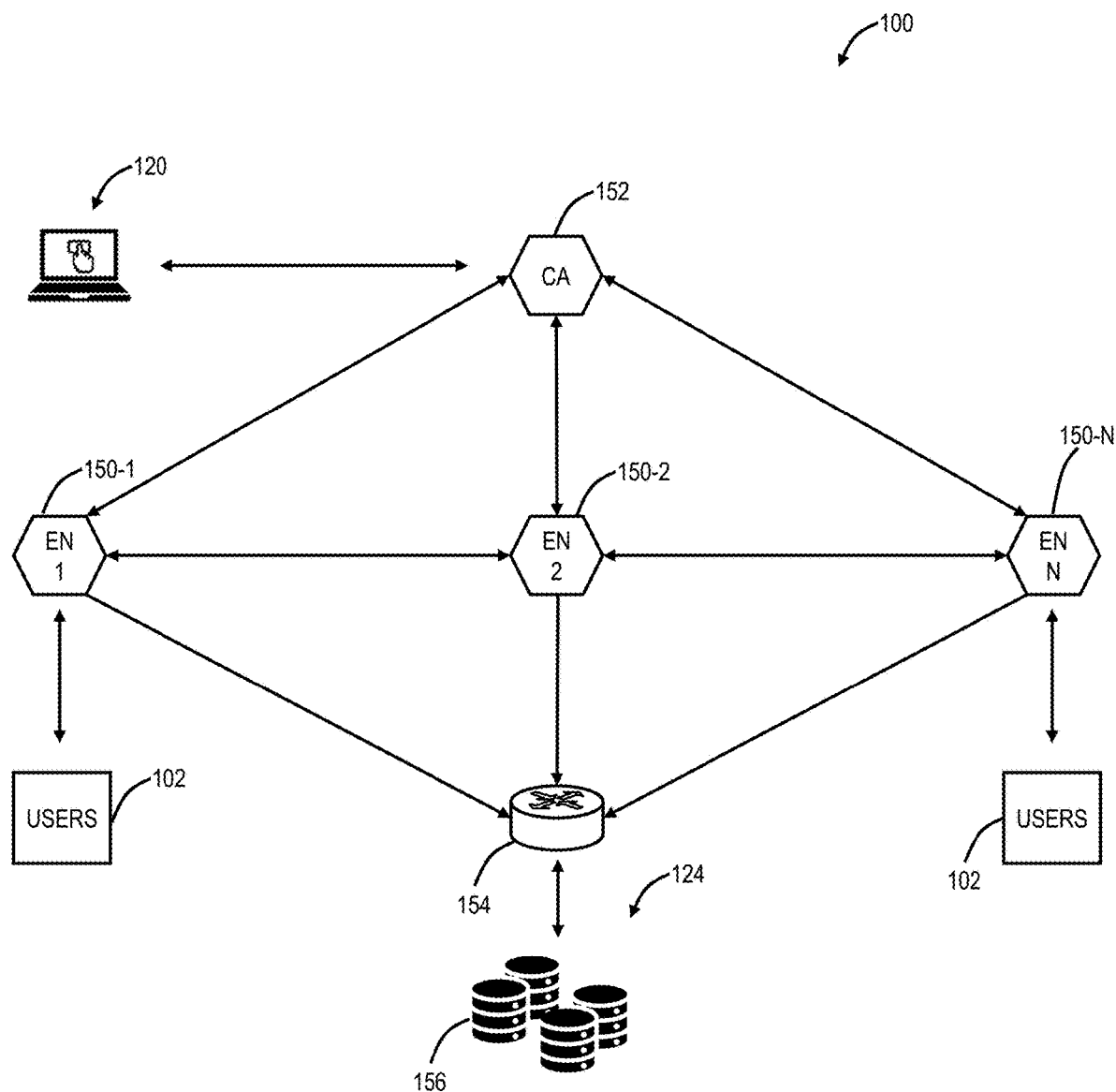
FIG. 2 is a network diagram of an example implementation of the cloud-based system.
Figure 4:
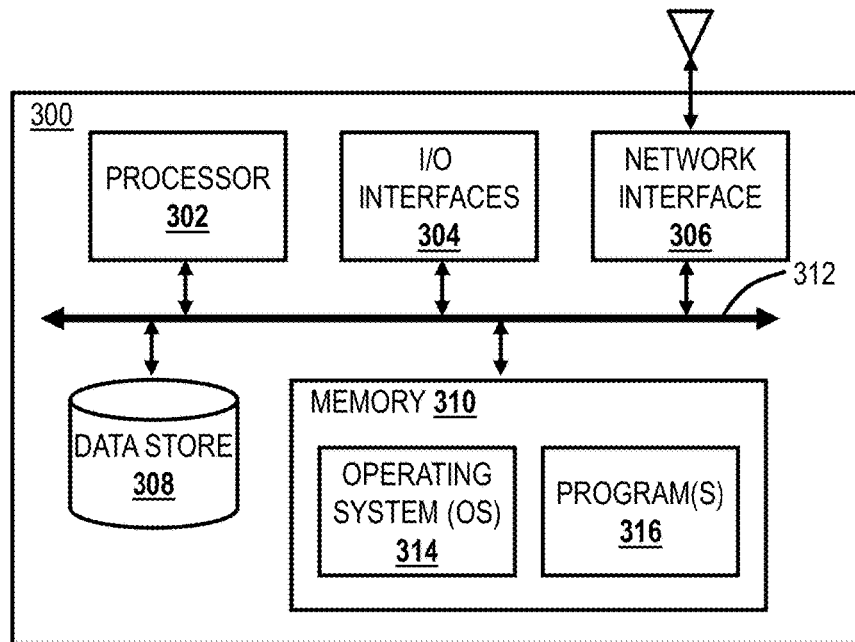

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150. Of note, the cloud-based system is an external system meaning it is separate from tenant's private networks (enterprise networks) as well as from networks associated with the devices 110, 116, and locations 112, 118.

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

§ 2.0 User Device Application for Traffic Forwarding and Monitoring

Figure 3:
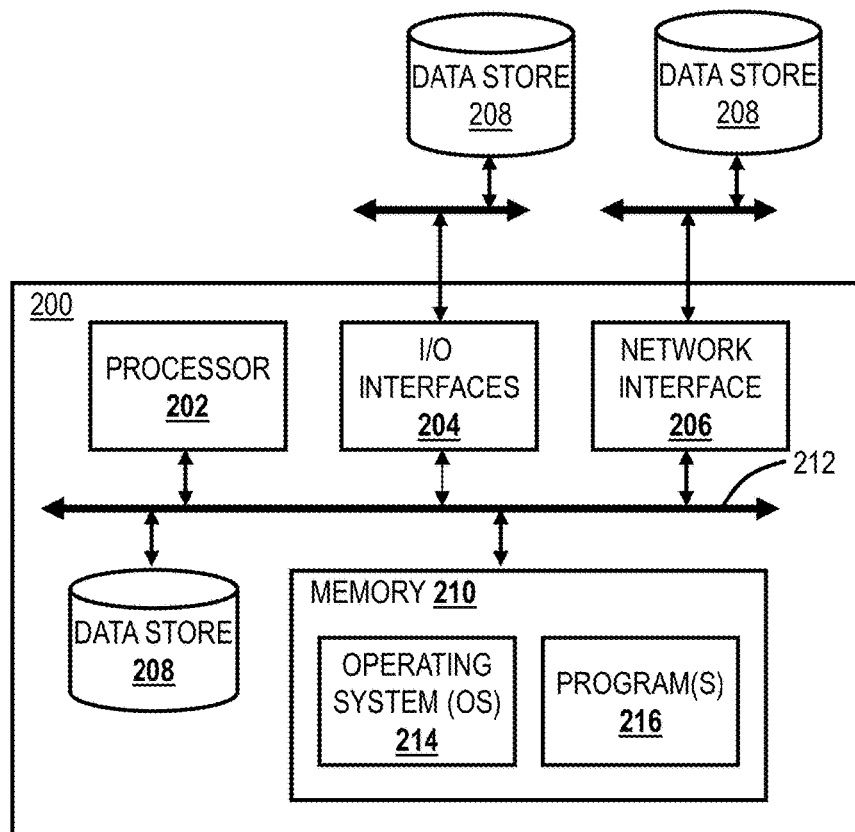

FIG. 3 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best in class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPsec VPN, authentication cookies, or user 102 setup.

§ 3.0 Example Server Architecture

FIG. 4 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

§ 4.0 Example User Device Architecture

FIG. 5 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 5 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

§ 5.0 Zero Trust Network Access Using the Cloud-Based System

Figure 6:
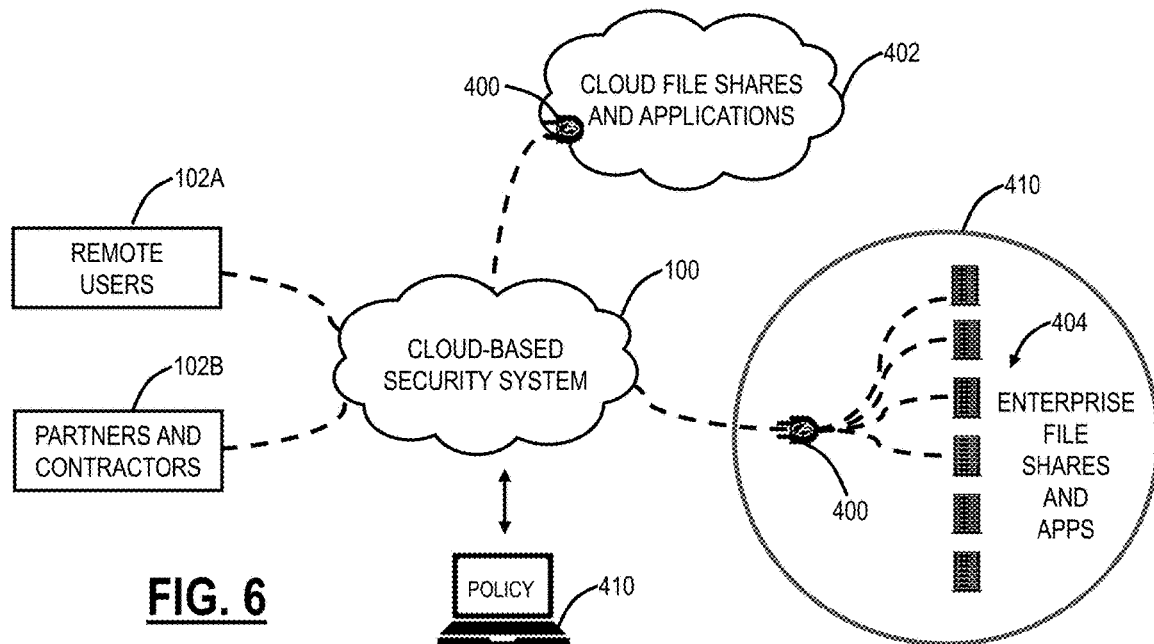
FIG. 6 is a network diagram of a Zero Trust Network Access (ZTNA) application utilizing the cloud-based system of FIGS. 1 and 2.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by the application 350 on the user device 300. Also, the applications 402, 404 can include B2B applications. Note, the difference between the applications 402, 404 is the applications 402 are hosted in the cloud, whereas the applications 404 are hosted on the enterprise network 410. The B2B service described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

§ 6.0 Digital Experience Monitoring

Figure 7:
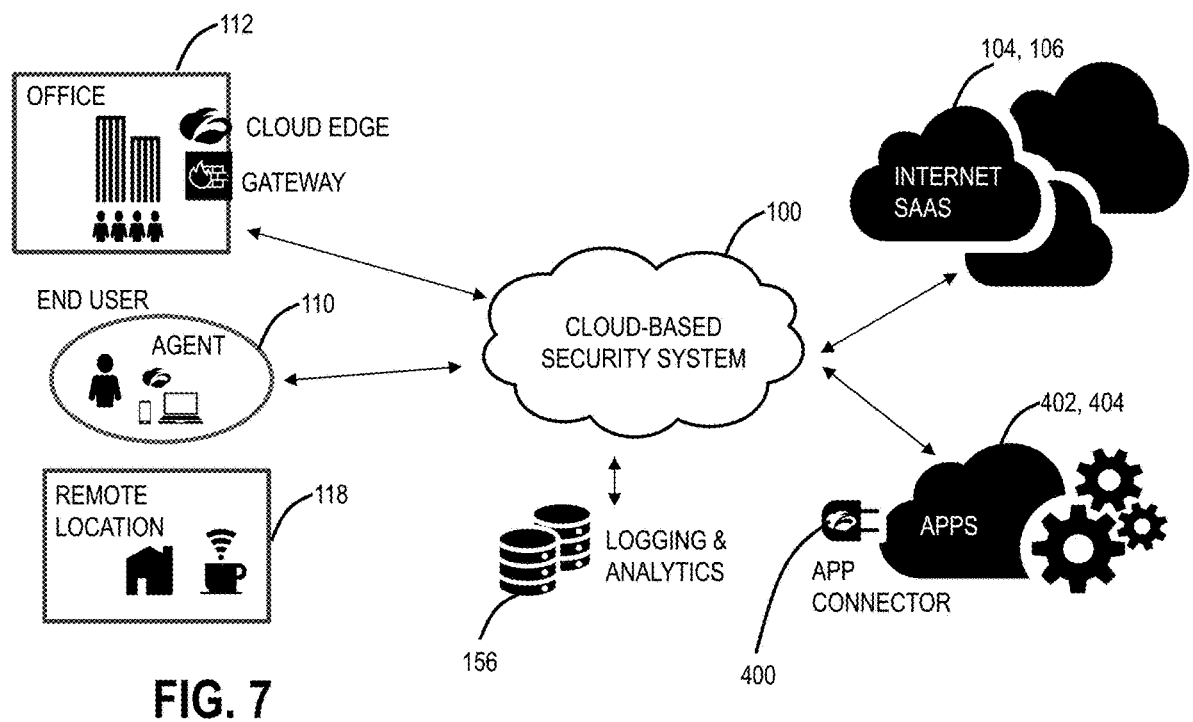
FIG. 7 is a network diagram of the cloud-based system of FIGS. 1 and 2 in an application of digital experience monitoring.

FIG. 7 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

| | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

| | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

| | |
|---|---|
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

§ 7.0 Cloud Tunnel

Figure 8:
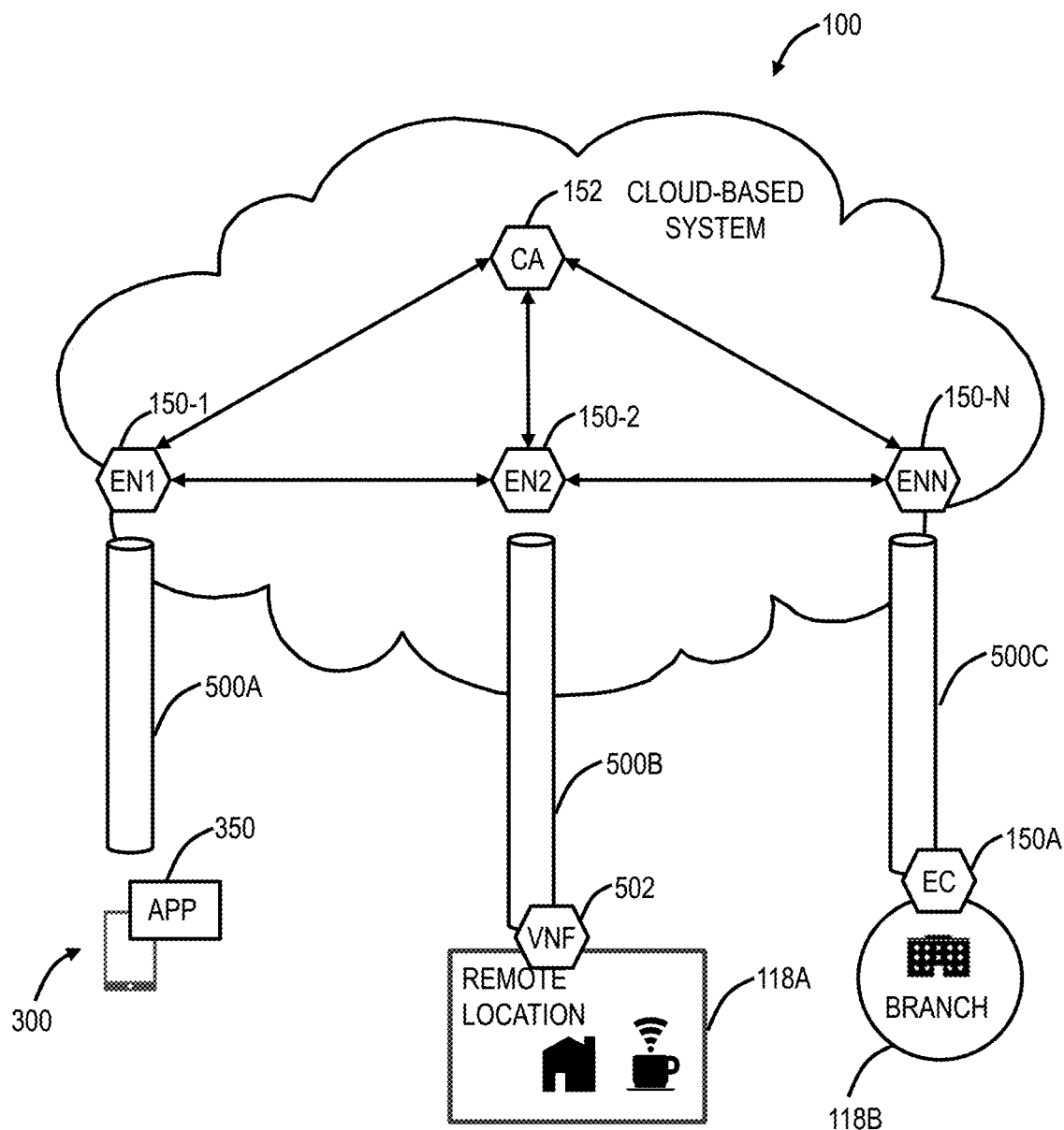
FIG. 8 is a network diagram of the cloud-based system of FIGS. 1 and 2 with various cloud tunnels, labeled as cloud tunnels, for forwarding traffic.
Figure 9:
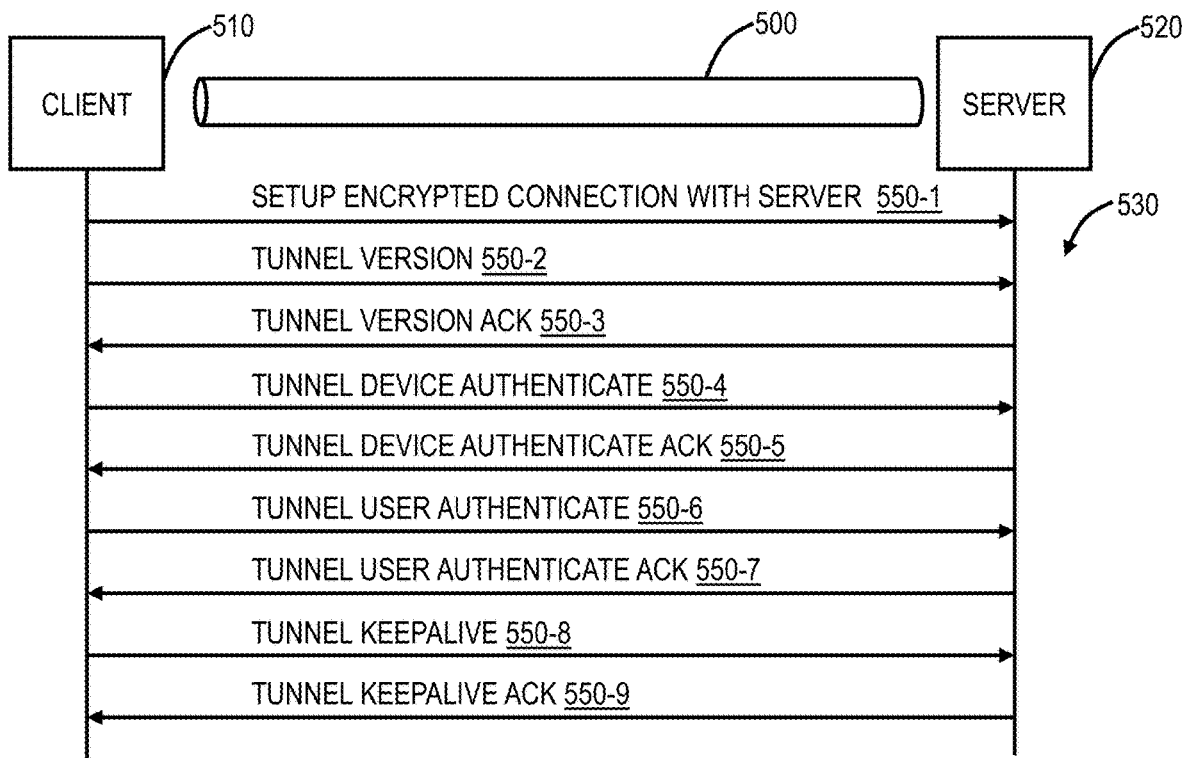
FIGS. 9 and 10 are flow diagrams of a cloud tunnel illustrating a control channel (FIG. 9) and a data channel (FIG. 10), with the tunnel illustrated between a client and a server.
Figure 10:
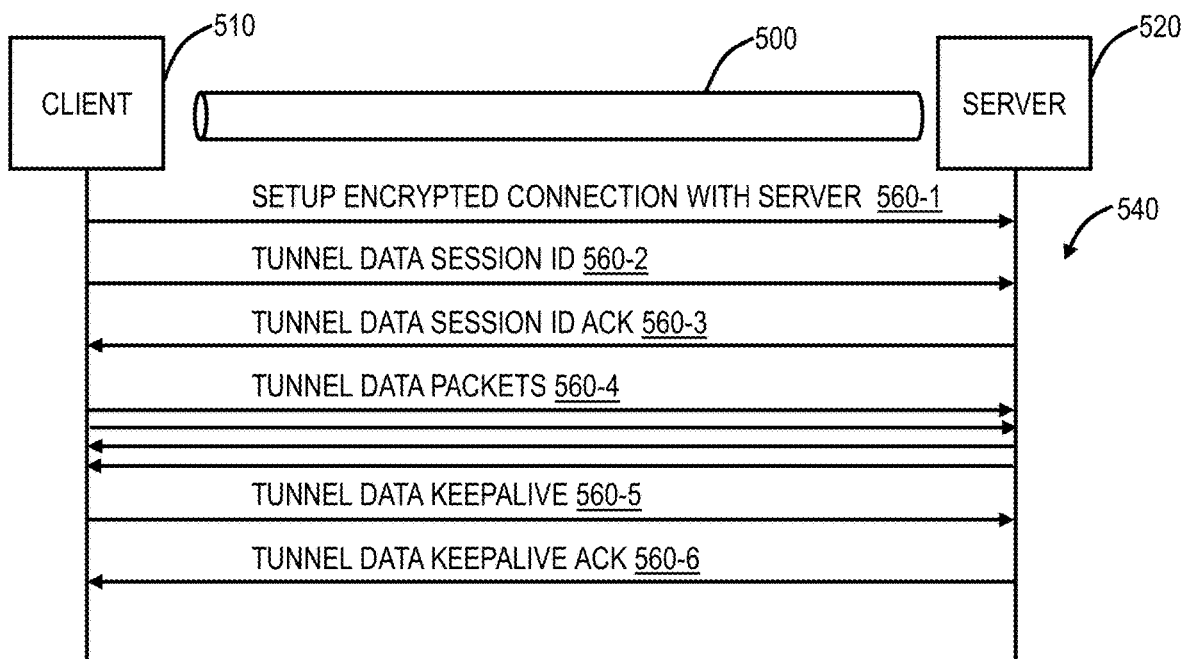

FIG. 8 is a network diagram of the cloud-based system 100 with various cloud tunnels 500, labeled as cloud tunnels 500A, 500B, 500C, for forwarding traffic. FIGS. 9 and 10 are flow diagrams of a cloud tunnel 500 illustrating a control channel (FIG. 9) and a data channel (FIG. 10), with the tunnel illustrated between a client 510 and a server 520. The cloud tunnel 500 is a lightweight tunnel that is configured to forward traffic between the client 510 and the server 520. The present disclosure focuses on the specific mechanisms used in the cloud tunnel 500 between two points, namely the client 510 and the server 520. Those skilled in the art will recognize the cloud tunnel 500 can be used with the cloud-based system 100 as an example use case, and other uses are contemplated. That is, the client 510 and the server 520 are just endpoint devices that support the exchange of data traffic and control traffic for the tunnel 500. For description, the server 520 can be referred to as a local node and the client 510 as a remote node, where the tunnel operates between the local and remote nodes.

In an embodiment, the cloud-based system 100 can use the cloud tunnel 500 to forward traffic to the enforcement nodes 150, such as from a user device 300 with the application 350, from a branch office/remote location 118, etc. FIG. 8 illustrates three example use cases for the cloud tunnel 500 with the cloud-based system 100, and other uses are also contemplated. In a first use case, a cloud tunnel 500A is formed between a user device 300, such as with the application 350, and an enforcement node 150-1. For example, when a user 102 associated with the user device 300 connects to a network, the application 350 can establish the cloud tunnel 500A to the closest or best enforcement node 150-1, and forward the traffic through the cloud tunnel 500A so that the enforcement node 150-1 can apply the appropriate security and access policies. Here, the cloud tunnel 500A supports a single user 102, associated with the user device 300.

In a second use case, a cloud tunnel 500B is formed between a Virtual Network Function (VNF) 502 or some other device at a remote location 118A and an enforcement node 150-2. Here, the VNF 502 is used to forward traffic from any user 102 at the remote location 118A to the enforcement node 150-2. In a third use case, a cloud tunnel 110C is formed between an on-premises enforcement node, referred to as an Edge Connector (EC) 150A, and an enforcement node 150-N. The edge connector 150A can be located at a branch office 118A or the like. In some embodiments, the edge connector 150A can be an enforcement node 150 in the cloud-based system 100 but located on-premises with a tenant. Here, in the second and third use cases, the cloud tunnels 500B, 500C support multiple users 102.

There can be two versions of the cloud tunnel 500, referred to a tunnel 1 and tunnel 2. The tunnel 1 can only support Web protocols as an HTTP connect tunnel operating on a TCP streams. That is, the tunnel 1 can send all proxy-aware traffic or port 80/443 traffic to the enforcement node 150, depending on the forwarding profile configuration. This can be performed via CONNECT requests, similar to a traditional proxy.

The tunnel 2 can support multiple ports and protocols, extending beyond only web protocols. As described herein, the cloud tunnels 500 are the tunnel 2. In all of the use cases, the cloud tunnel 500 enables each user device 300 to redirect traffic destined to all ports and protocols to a corresponding enforcement node 150. Note, the cloud-based system 100 can include load balancing functionality to spread the cloud tunnels 500 from a single source IP address. The cloud tunnel 500 supports device logging for all traffic, firewall, etc., such as in the storage cluster 156. The cloud tunnel 500 utilizes encryption, such as via TLS or DTLS, to tunnel packets between the two points, namely the client 510 and the server 520. As described herein, the client 510 can be the user device 300, the VNF 502, and/or the edge connector 150A, and the server 520 can be the enforcement node 150. Again, other devices are contemplated with the cloud tunnel 500.

The cloud tunnel 500 can use a Network Address Translation (NAT) device that does not require a different egress IP for each device's 300 separate sessions. Again, the cloud tunnel 500 has a tunneling architecture that uses DTLS or TLS to send packets to the cloud-based system 100. Because of this, the cloud tunnel 500 is capable of sending traffic from all ports and protocols.

Thus, the cloud tunnel 500 provides complete protection for a single user 102, via the application 350, as well as for multiple users at remote locations 118, including multiple security functions such as cloud firewall, cloud IPS, etc. The cloud tunnel 500 includes user-level granularity of the traffic, enabling different users 102 on the same cloud tunnel 500 for the enforcement nodes 150 to provide user-based granular policy and visibility. In addition to user-level granularity, the cloud tunnel 500 can provide application-level granularity, such as by mapping mobile applications (e.g., Facebook, Gmail, etc.) to traffic, allowing for app-based granular policies.

FIGS. 9 and 10 illustrate the two communication channels, namely a control channel 530 and a data channel 540, between the client 510 and the server 520. Together, these two communication channels 530, 540 form the cloud tunnel 500. In an embodiment, the control channel 530 can be an encrypted TLS connection or SSL connection, and the control channel 530 is used for device and/or user authentication and other control messages. In an embodiment, the data channel 540 can be an encrypted DTLS or TLS connection, i.e., the data channel can be one or more DTLS or TLS connections for the transmit and receive of user IP packets. There can be multiple data channels 540 associated with the same control channel 530. The data channel 540 can be authenticated using a Session Identifier (ID) from the control channel 530.

Of note, the control channel 530 always uses TLS because some locations (e.g., the remote location 118A, the branch office 118B, other enterprises, hotspots, etc.) can block UDP port 443, preventing DTLS. Whereas TLS is widely used and not typically blocked. The data channel 540 preferably uses DTLS, if it is available, i.e., not blocked on the client 510. If it is blocked, the data channel 540 can use TLS instead. For example, DTLS is the primary protocol for the data channel 540 with TLS used as a fallback over TCP port 443 if DTLS is unavailable, namely if UDP port 443 is blocked at the client 510.

Figure 11:
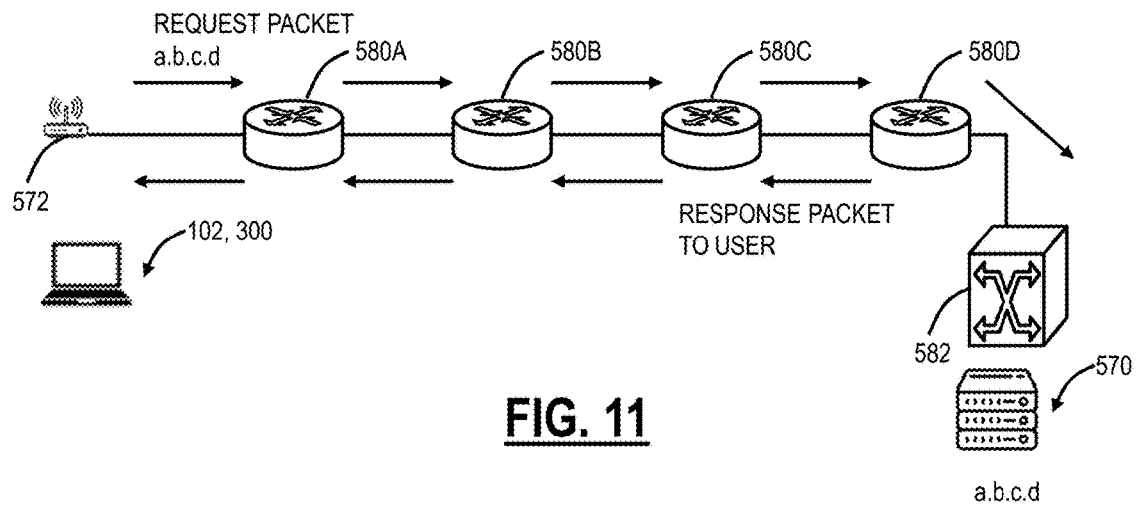

In FIG. 9, the control channel 530 is illustrated with exchanges between the client 510 and the server 520. Again, the control channel 530 includes TLS encryption, which is established through a setup or handshake between the client 510 and the server 520 (step 550-1). An example of a handshake is illustrated in FIG. 11. The client 510 can send its version of the tunnel 500 to the server 520 (step 550-2) to which the server 520 can acknowledge (step 550-3). For example, the version of the tunnel can include a simple version number or other indication, as well as an indication of whether the client 510 supports DTLS for the data channel 540. Again, the control channel 530 is fixed with TLS or SSL, but the data channel 540 can be either DTLS or TLS.

The client 510 can perform device authentication (step 550-4), and the server 520 can acknowledge the device authentication (step 550-5). The client 510 can perform user authentication (step 550-6), and the server 520 can acknowledge the user authentication (step 550-7). Note, the device authentication includes authenticating the user device 300, such as via the application 350, the VNF 502, the edge connector 150A, etc. The user authentication includes authenticating the users 102 associated with the user devices 300. Note, in an embodiment, the client 510 is the sole device 300, and here the user authentication can be for the user 102 associated with the client 510, and the device authentication can be for the user device 300 with the application 350. In another embodiment, the client 510 can have multiple user devices 300 and corresponding users 102 associated with it. Here, the device authentication can be for the VNF 502, the edge connector 150A, etc., and the user authentication can be for each user device 300 and corresponding user 102, and the client 510 and the server 520 can have a unique identifier for each user device 300, for user-level identification.

The device authentication acknowledgment can include a session identifier (ID) that is used to bind the control channel 530 with one or more data channels 540. The user authentication can be based on a user identifier (ID) that is unique to each user 102. The client 510 can periodically provide keep alive packets (step 550-8), and the server 520 can respond with keep alive acknowledgment packets (step 550-9). The client 510 and the server 520 can use the keep alive packets or messages to maintain the control channel 530. Also, the client 510 and the server 520 can exchange other relevant data over the control channel 530, such as metadata, which identifies an application for a user 102, location information for a user device 300, etc.

In FIG. 10, similar to FIG. 9, the data channel 540 is illustrated with exchanges between the client 510 and the server 520. Again, the data channel 540 includes TLS or DTLS encryption, which is established through a setup or handshake between the client 510 and the server 520 (step 560-1). An example of a handshake is illustrated in FIG. 11. Note, the determination of whether to use TLS or DTLS is based on the session ID, which is part of the device authentication acknowledgment, and which is provided over the data channel 540 (steps 560-2, 560-3). Here, the client 510 has told the server 520 its capabilities, and the session ID reflects what the server 520 has chosen, namely TLS or DTLS, based on the client's 510 capabilities. In an embodiment, the server 520 chooses DTLS if the client 510 supports it, i.e., if UDP port 443 is not blocked, otherwise the server 520 chooses TLS. Accordingly, the control channel 530 is established before the data channel 540. The data channel 540 can be authenticated based on the session ID from the control channel 530.

The data channel 540 includes the exchange of data packets between the client 510 and the server 520 (step 560-4). The data packets include an identifier such as the session ID and a user ID for the associated user 102. Additionally, the data channel 540 can include keep alive packets between the client 510 and the server 520 (steps 560-5, 560-6).

The cloud tunnel 500 can support load balancing functionality between the client 510 and the server 520. The server 520 can be in a cluster, i.e., multiple servers 200. For example, the server 520 can be an enforcement node 150 cluster in the cloud-based system 100. Because there can be multiple data channels 540 for a single control channel 530, it is possible to have the multiple data channels 540, in a single cloud tunnel 500, connected to different physical servers 200 in a cluster. Thus, the cloud-based system 100 can include load balancing functionality to spread the cloud tunnels 500 from a single source IP address, i.e., the client 510.

Also, the use of DTLS for the data channels 540 allows the user devices 300 to switch networks without potentially impacting the traffic going through the tunnel 500. For example, a large file download could continue uninterrupted when a user device 300 moves from Wi-Fi to mobile, etc. Here, the application 350 can add some proprietary data to the DTLS client-hello servername extension. That proprietary data helps a load balancer balance the new DTLS connection to the same server 200 in a cluster where the connection prior to network change was being processed. So, a newly established DTLS connection with different IP address (due to network change) can be used to tunnel packets of the large file download that was started before the network change. Also, some mobile carriers use different IP addresses for TCP/TLS (control channel) and UDP/DTLS (data channel) flows. The data in DTLS client-hello helps the load balancer balance the control and data connection to the same server 200 in the cluster.

§ 8.0 Trace

An example trace can be with a traceroute be based on Internet Control Message Protocol (ICMP), TCP, User Datagram Protocol (UDP), etc. For example, a traceroute based on ICMP provides all hops on the network. TCP and UDP are also supported by most clients, if ICMP is blocked. The response from the traceroute provides a holistic view of the network with packet loss details and latency details. FIG. 11 is a network diagram of a traceroute between a user 102 and a destination 570 with no tunnel in between. Here, the user 102 (via a user device 300) connects to an access point 572, which connects to the destination 570 via routers 580A-580D and a switch 582. The traceroute includes transmitting a request packet from the user 102 to the destination 570 (with an address of a.b.c.d) via the access point 572, the routers 580, and the switch 582. Each of these intermediate devices 572, 580, 582 process the request packet and the enforcement node 150 sends a response packet back to the user 102, which is also processed by the intermediate devices 572, 580, 582. Accordingly, all hops in the network are visible.

Figure 12:
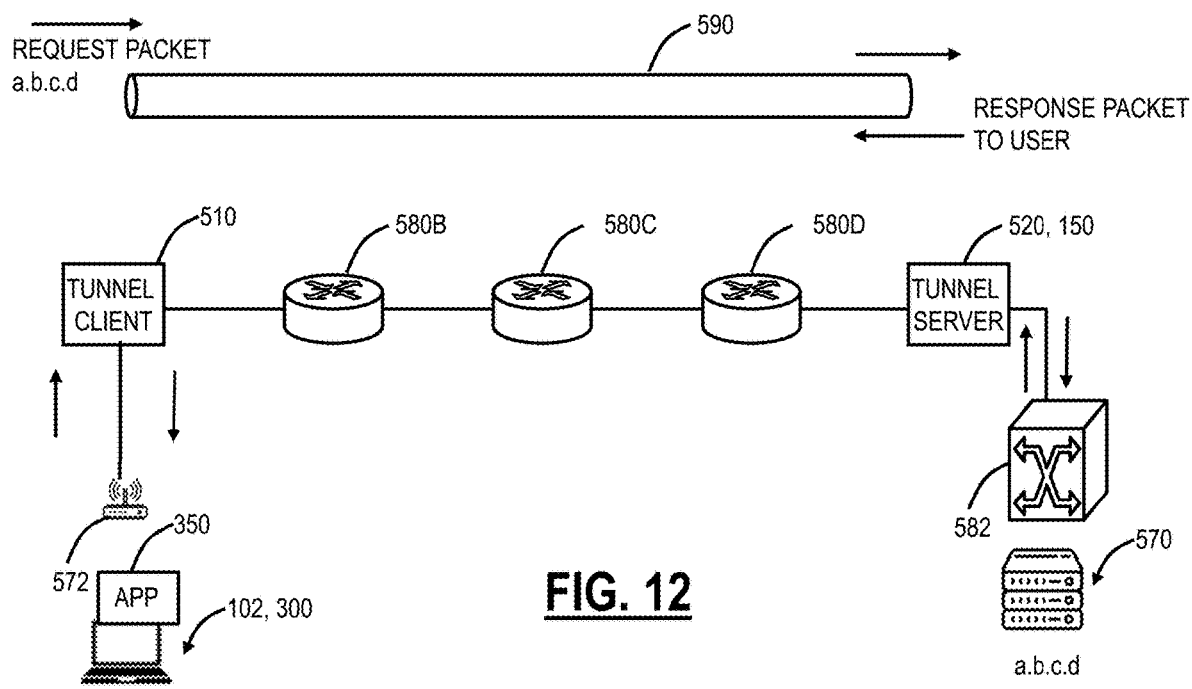
FIG. 12 is a network diagram of a trace between a user and a destination with an opaque tunnel between a tunnel client and a tunnel server.

FIG. 12 is a network diagram of a trace between a user 102 and the destination 570 with an opaque tunnel 590 between a tunnel client 510 and a tunnel server 520. The opaque tunnel 590 can be the tunnel 500 as well as a GRE, IPsec, VPN, etc. The opaque tunnel 590 is referred to as opaque because there is no visibility into the tunnel. The traceroute in FIG. 12, based on ICMP, TCP, UDP, etc., provides visibility of the hops before and after the opaque tunnel 590, but does not provide visibility in the opaque tunnel 590. There are no details about packet loss or latency while tunneled transmission. Also, the opaque tunnel 590 can be referred to as an overlay tunnel.

Traceroute includes a series of packets that are exchanged from a probe initiator along a path. Each trace packet includes an increasing TTL value. When a node along the path receives a trace packet where the TTL expires, it sends a response. Based on all of the responses, it is possible for the probe initiator (e.g., the client) to determine the network hops, the latency at each hop, packet loss, and other details. Again, the traceroute can be an MTR, which also includes PING functionality. Again, MTR is used to traceroute the destination to show the latency, packet loss, and hop information between an initiator and destination. It helps to understand the network status and diagnose network issues.

In an embodiment, MTR is implemented on the user device 300, such as through the application 350, and on the tunnel server 520 and/or the enforcement node 150. As is described herein, there is a requirement to implement probes at two points in the service path—at the client and at the tunnel server 520 and/or the enforcement node 150. The MTR implementation can support ICMP, UDP, and/or TCP. For ICMP, two sockets are used to send and receive probes, and the ICMP sequence number in reply messages are used to match ICMP request messages. For UDP, one UDP socket is created to send UDP probes, and one ICMP socket is created to receive ICMP error messages. For TCP, one raw socket is created to send TCP probes, and one ICMP socket is created to receive ICMP error messages, and the TCP socket is also used to receive SYN-ACK/RST from the destination. The foregoing functionality can be performed by the application 350 on the user device 300 and a tracing service on the enforcement node 150. SYN=Synchronize, ACK=Acknowledgment, and RST=Reset.

§ 9.0 Cloud-Based Analyzer

Figure 13:
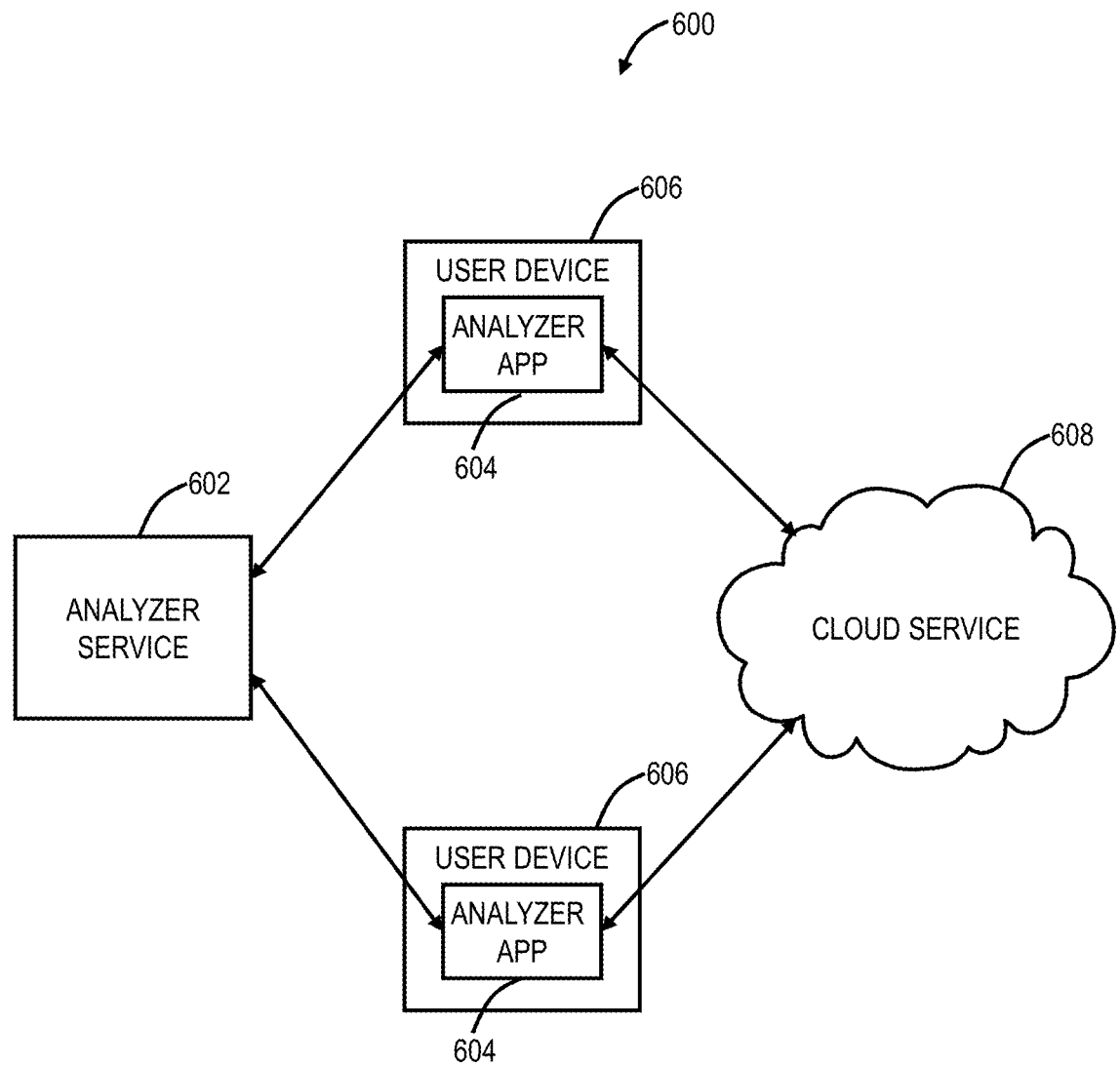
FIG. 13 is a network diagram of a network with a cloud-based analyzer service operating with analyzer apps on client devices using a cloud-based service.
Figure 14:
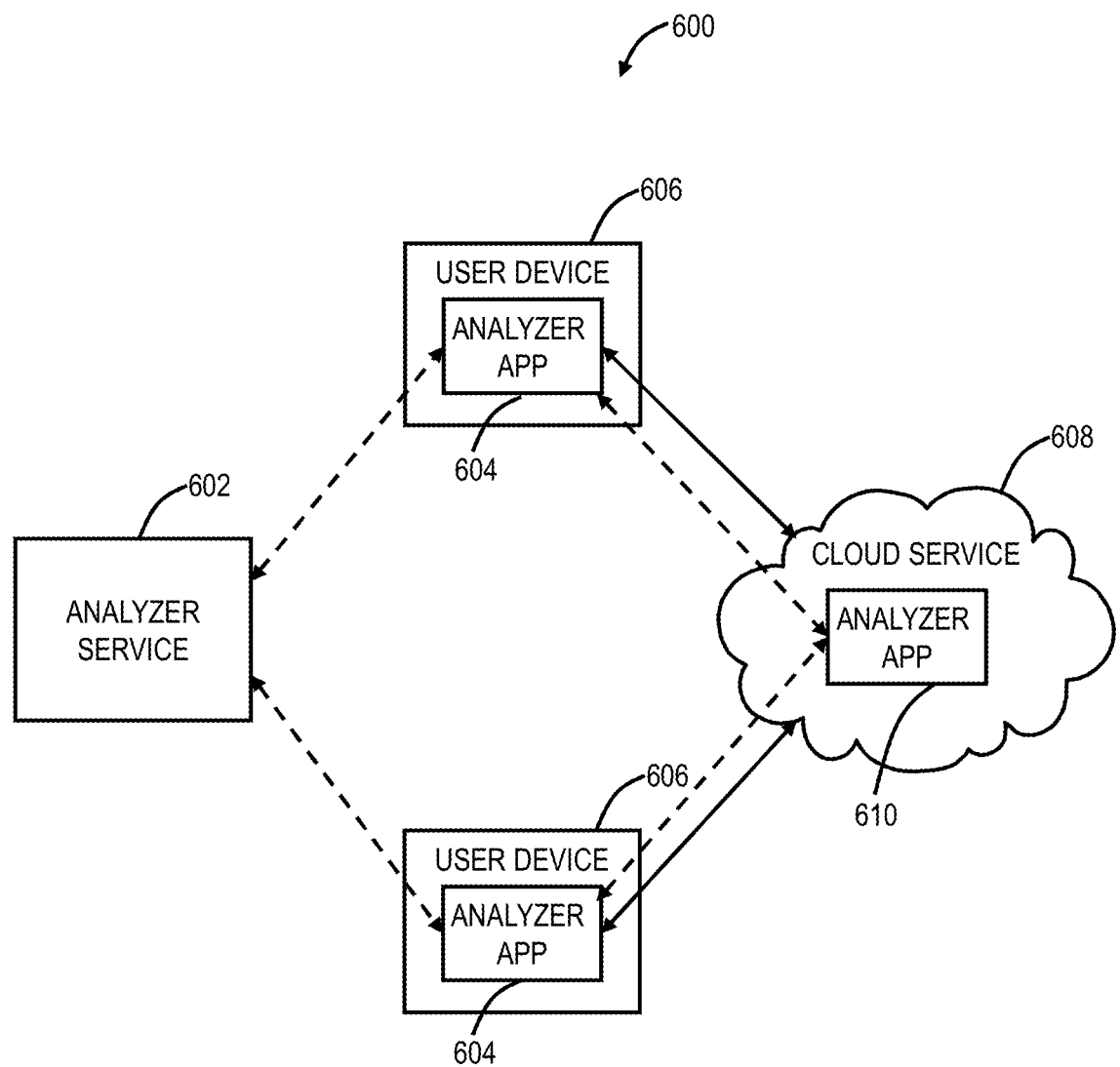
FIG. 14 is a network diagram of a network with the cloud-based analyzer service operating with analyzer apps on client devices using a cloud-based service along with an analyzer app also operating in the cloud-based service.
Figure 15:
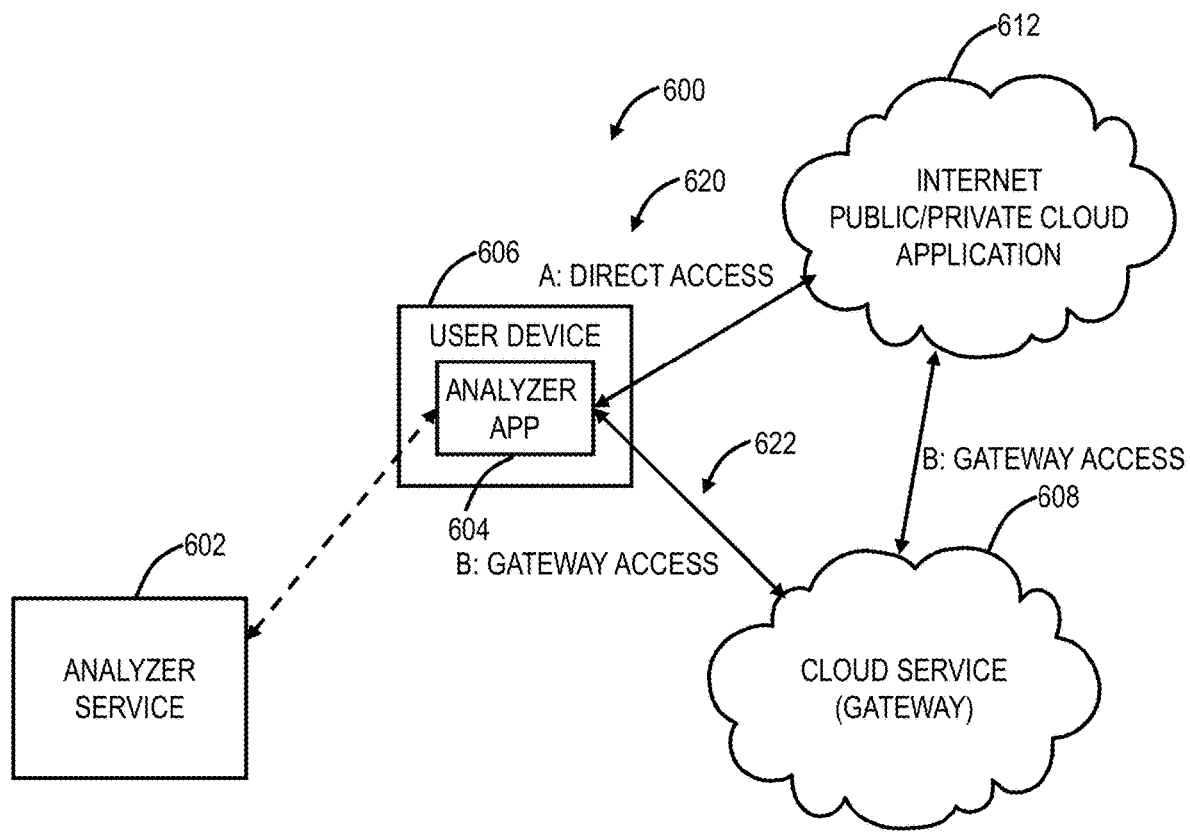
FIG. 15 is a network diagram of a network with the cloud-based analyzer service operating with analyzer apps on client devices using the cloud-based service as a gateway for another cloud, such as the Internet, public/private cloud applications, etc.

FIGS. 13-15 are network diagrams of a network 600 with a cloud-based analyzer service 602 operating therein. FIG. 13 illustrates the network 600 with the cloud-based analyzer service 602 operating with analyzer apps 604 on user devices 606 using a cloud-based service 608. FIG. 14 illustrates the network 600 with the cloud-based analyzer service 602 operating with analyzer apps 604 on client devices 606 using a cloud-based service 608 along with an analyzer app 610 also operating in the cloud-based service 608. FIG. 15 illustrates the network 600 with the cloud-based analyzer service 602 operating with analyzer apps 604 on user devices 606 using the cloud-based service 608 as a gateway for another cloud 612, such as the Internet, public/private cloud applications, etc.

The cloud-based service 608 is any application or service delivered via a cloud-based platform. This could be an Internet-based service or hosted on public or private cloud infrastructure. The cloud-based service 608 can be the cloud-based system 100 or the like. The user device 606 is an end user device that accesses the cloud-based service 608, such as the user device 300. This could be a laptop or mobile device or any other device that connects to the cloud-based service 608 and leverages it.

The analyzer app 604 is an application (computer-readable instructions) that is run on the user device 606 to collect diagnostic information and SLA-related metrics for the cloud-based service 608. The analyzer service 602 can be a cloud-based service communicatively coupled to the analyzer app 610 (and to various analyzer apps 610) to archive and analyze collected metrics and to update and control the analyzer app 610. The analyzer service 610 can be part of the physical cloud where the cloud-based service 608 is hosted or separate. The analyzer app 604 can be the application 350.

Again, in operation, the analyzer app 604 operates on the user device 606 to collect network diagnostics between the user device 606 and the cloud-based service 608. In FIG. 13, the analyzer apps 604 are run on various user devices 606 to collect data based on performance monitoring with the cloud-based service 608 and to communicate the collected data to the analyzer service 602. In FIG. 14, the analyzer app 610 is also run in the cloud-based service 608, such as one or more instances communicatively coupled to associated user devices 606 as needed for performing a test. This enables additional local diagnostics in the cloud-based service 608 to share with the corresponding analyzer app 604 on the user device 606 as well as providing for bi-directional visibility between the user device 606 and the cloud-based service 608 for performance and availability.

In FIG. 15, the cloud-based service 608 is a gateway for an ultimate end destination such as the cloud 612. This gateway example is the use case where the cloud-based service 608 is the cloud-based system 100 or the like for in-line monitoring. Requests from the user device 606 are proxied to the end destination that could be on the Internet or hosted on a public or private cloud. The analyzer app 604 can profile performance when going direct (via path A 620) versus going through the cloud-based service 608 as a gateway (via path B 622). Importantly, the comparative performance metrics between the paths 620, 622 provide insight into the performance issues using the cloud-based service 608 for in-line monitoring. These insights can be used to configure the cloud-based service 608, to add additional capacity in both the associated network and computing power of the cloud-based service 608, to troubleshoot the cloud-based service 608, and the like. Importantly, in-line monitoring should be as efficient as possible to avoid degradation in the user experience. These insights provide the cloud-based provider opportunity for optimization. In FIG. 15, it is possible to download build in websites or user-specified websites with and without the proxy (the cloud-based service 608) to measure download times.

Examples of the network diagnostic include MTR trace to detect intermediate hops and latency at each hop. My traceroute (MTR) is a computer program which combines the functions of the traceroute and ping programs in one network diagnostic tool. MTR probes routers on the route path by limiting the number of hops individual packets may traverse, and listening to responses of their expiry. It will regularly repeat this process, usually once per second, and keep track of the response times of the hops along the path. The MTR can include packet captures when certain conditions are detected and be used to derive network metrics such as throughput, error rates, jitter, etc. The MTR can be used to detect intermediate hops and latency at each hop. The MTR can also perform multi-point traceroutes through the cloud-based service 608 to determine optimal paths within the cloud-based service 608.

The analyzer app 604 can measure SLA metrics associated with the cloud-based service 606 including processing latency introduced by service, response times for one or more requests, application performance metrics, service availability, and the like. The processing latency is based on the various aforementioned techniques related to security processing in the cloud. Optimization of this processing latency is important for proper user experience. One example approach to measure SLA metrics includes a webload functionality which analyzes the time it takes an embedded web browser on the user device 606 to load a web page. In FIG. 15, the webload functionality can be performed with and without the cloud-based service 608 to compare the results. In the case where the cloud-based service 608 is the cloud-based system 100, the webload without the cloud-based service 608 can be constrained to a known good website to avoid potential problems since the cloud-based service 608 is not used for security monitoring here. Also, the user device 606 can be configured only to avoid the cloud-based system 608 with the analyzer app 604 for metric collections.

The analyzer app 604 can be set to run on a preconfigured schedule, in response to certain cloud-based service 608 events, and/or specific anomalies detected in the user device 606. The preconfigured schedule provides the analyzer service 602 continuous metrics to monitor health over time of the entire cloud-based service 608. For example, every night at a certain time and every day at a certain time. Various other preconfigured schedules are contemplated. For the cloud-based service events, the cloud-based service 608 can be configured to cause the analyzer apps 604 to operate, such as via communication thereto or to the analyzer service 602. For example, the cloud-based service 608 can detect performance degradation such as particular locations and instruct some or all user devices 606 to operate the analyzer app 604. Again, various other combinations are contemplated. Also, the user device 606 itself can automatically run the analyzer app 604 based on local detection of anomalies, such as poor response time to the cloud-based service 608 or the like.

The analyzer app 604 can log all metrics in a standardized format and periodically transmit the logs to the analyzer service 602 with timestamps, details of the user device 606, and other relevant information. The analyzer service 602 provides operators of the cloud-based service 608 an ability to analyze the metrics and isolate faults that may impact user experience. Also, the metrics can be used for network planning and the like. For example, a particular location is showing poor service due to increased usage, and the outcome could be to add network or processing capacity in that particular location to the cloud-based service 608. The analyzer service 602 also can be used to update the analyzer apps 604 with new functionality, fixes, and configurations.

The analyzer app 604 can be installed via software distribution from the Web, from the App Store (Apple), Google Play (Google), Windows marketplace (Microsoft), or the like. The analyzer app 604 and the analyzer service 602 both support Graphical User Interfaces (GUI). The analyzer app 604 can include scheduling configuration parameters via the GUI which may be modifiable by the user or locked and only modifiable by IT administrators. The GUI in both the analyzer app 604 and the analyzer service 602 can support analytics displays and the like.

§ 9.1 MTR

The MTR is used to analyze the path between the user device 606 and a node in the cloud-based service 608, such as the node 150. The analyzer app 604 performs an MTR (My Traceroute), and the results provide the analyzer service 602 with all the information needed to debug network issues quickly. Again, the analyzer app 604 can be run multiple times at different intervals, for a more comprehensive view of the network path. The results are designed to be sent to the analyzer service 602 for analysis. The experience and overall view of the entire cloud allow operators of the cloud-based service 608 an opportunity to interpret the data and identify potential issues in the network path. In an embodiment, the MTR is not run through a tunnel such as GRE or IPSec.

§ 9.2 Analyzer App GUI

Figure 16:
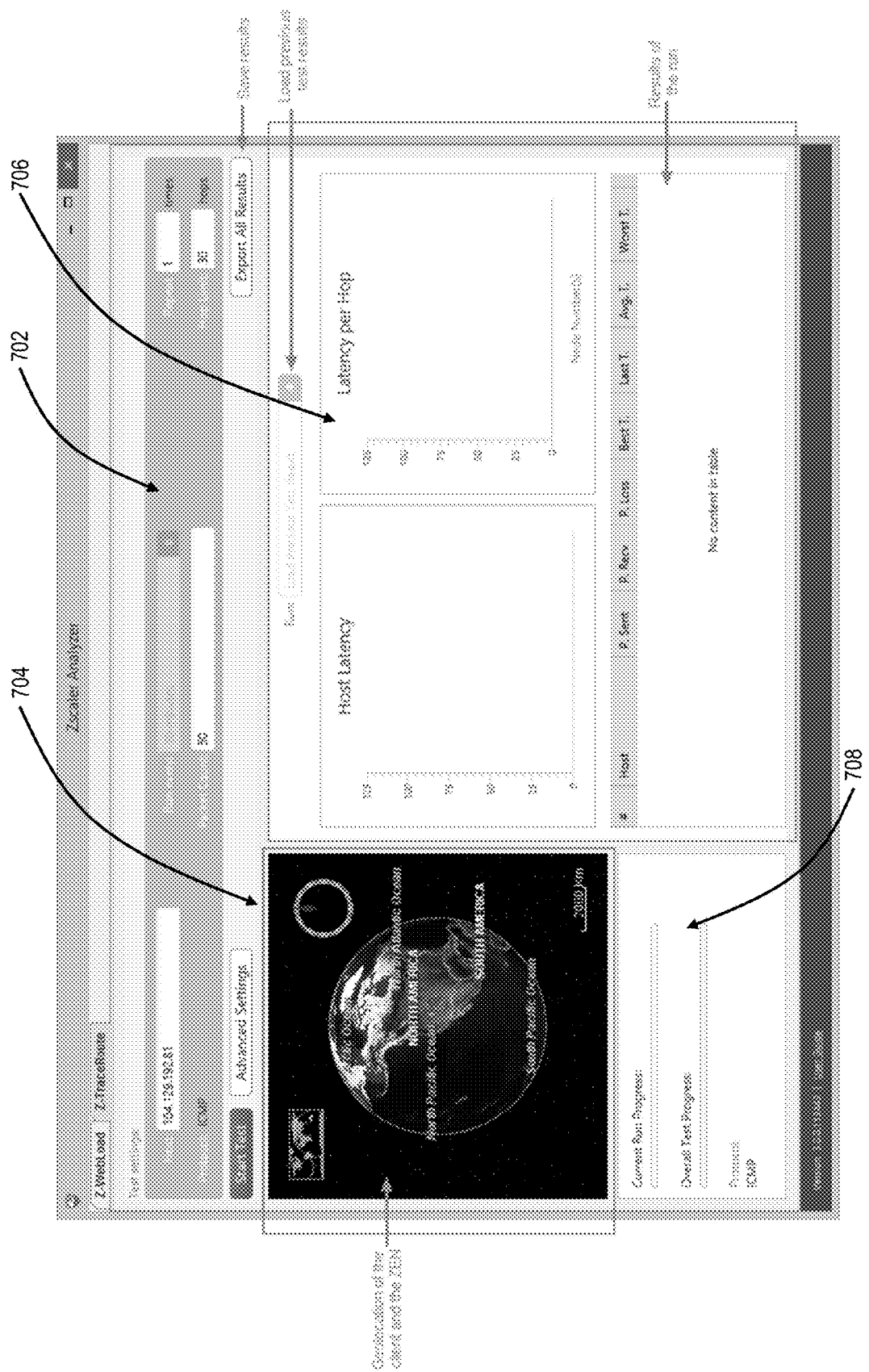
FIG. 16 is a Graphical User Interface (GUI) screen of the analyzer app at launch.
Figure 17:
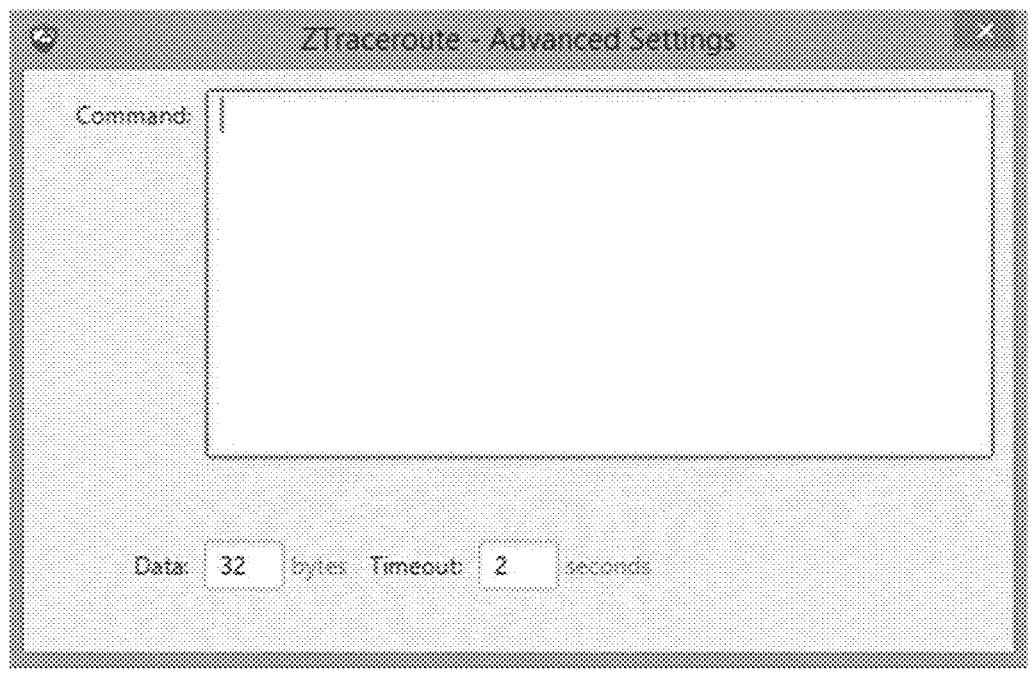
FIG. 17 is a GUI of a command line interface in the analyzer app.

FIG. 16 is a GUI screen illustrates the analyzer app 604 at launch. The GUI includes settings 702, a geolocation location 704, test results 706, and status 708. The geolocation location 704 can be the location of the user device 606 such as based on its IP address and/or location information from GPS and the location of the node 150. The settings 702 can be defined, such as for a host, run frequency, packet count, repetition, and hop limit. The host can be the node 150, or another defined node based on an IP address. The run frequency is based on the analyzer app 602 running automatically at different intervals. For example, to configure the app to run every hour, 10 times, change Repeat to 10, and then choose the interval to Repeat every 1 hour. These 10 tests are called a group. The packet count is a number of packets to send, and the hop limit is the maximum number of network hops measured.

There are advanced settings, for packet size in bytes, timeout, etc. Note, the settings, and the advanced settings can be set by the analyzer service 602 or the like. The following illustrates example advanced settings.

run [host=] [protocol=] [port=]
      [repeat=] [interval=] [data=]
      [count=] [maxhop=] [timeout=]
    Options:
    host Ping the specified host/IP address until stopped.
      Default: gateway.zscaler.net
    protocol Protocol to be used in probing.
      Valid: ICMP, TCP, UDP, Auto
      Default: ICMP
    port Port to be used in probing.
      Valid: [1-65535]
      Default: 80
    repeat Number of times to repeat the test.
      Valid: [1-99]
      Default: 1
    interval Gap between each test run (in minutes).
      Valid: [10, 15, 30, 60, 90, 120]
      Default: 10
    data Length of raw data used.
      Valid: [1-60]
      Default: 32
    count Number of packets per node.
      Valid: [1-99]
      Default: 50
    maxhop Number of maximum hops.
      Valid: [1-60]
      Default: 30
    timeout Timeout in seconds to wait for each reply.
      Valid: [1-60]
      Default: 2
    An example of the advanced settings can be:
    run count=10 timeout=5 host=gateway.zscaler.net maxhop=50

In FIG. 16, there is a radio button to start the test. The analyzer app 604 displays the geolocation of the user device

Figure 18:
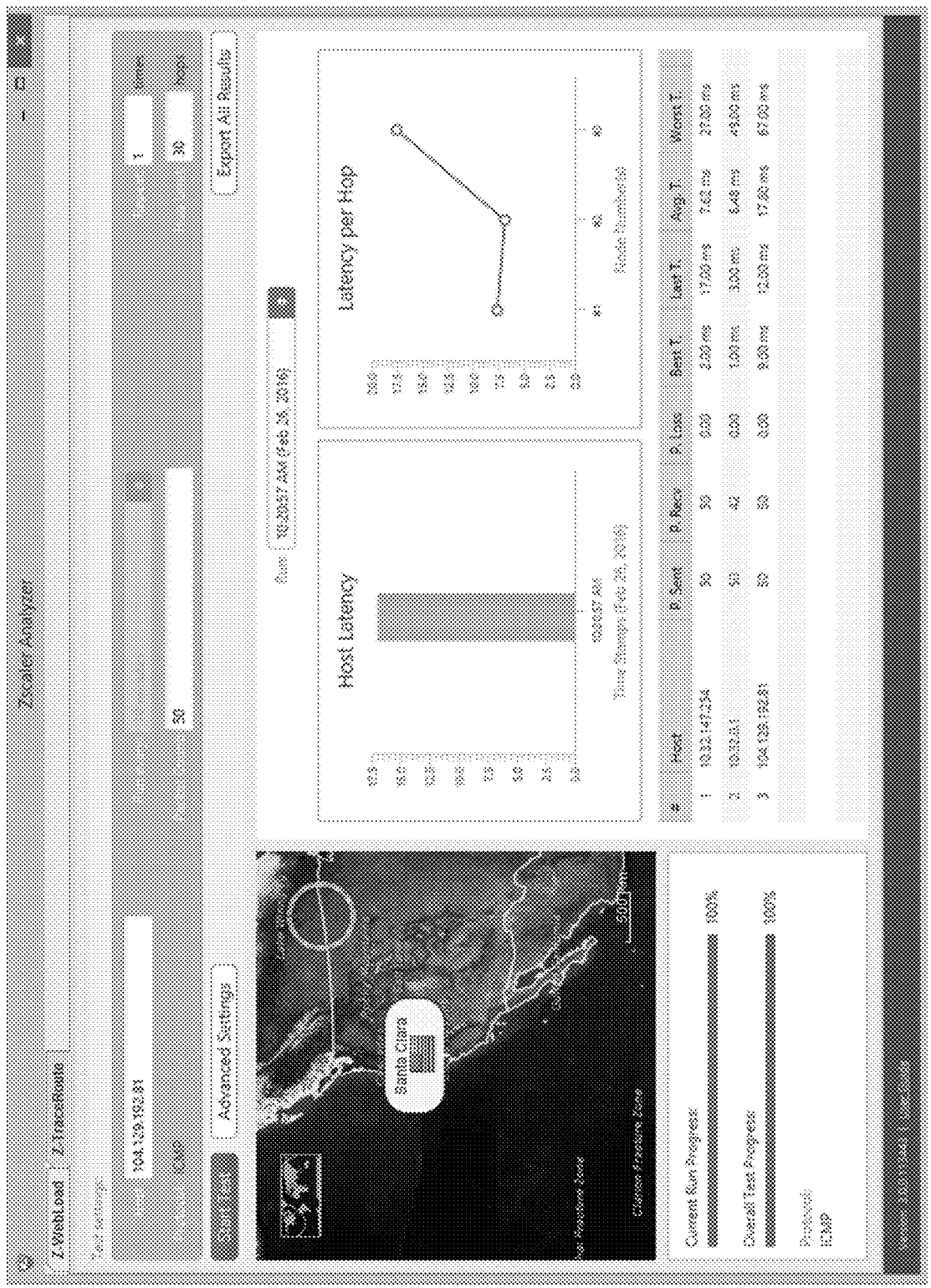
FIG. 18 is a GUI of an example run of the analyzer app.

606 and the cloud node 502 on the map, as shown in FIG. 16. Note that the locations shown may not be accurate. This is useful in determining if the client is geolocalized correctly or if its traffic is not going to the nearest cloud node 502. FIG. 18 illustrates the results of an example run. The analyzer app 604 updates the Host Latency and the Latency per Hop widgets, and the results table. The Stop Test button replaces the Start Test button, as shown below. If the user clicks the Stop Test button at any time, the analyzer app 604 cancels all the other tests in the group. The analyzer app 604 can be minimized before it completes all of the configured runs. When the analyzer app 604 completes all the runs, the Start Test button replaces the Stop Test button.

Figure 19:
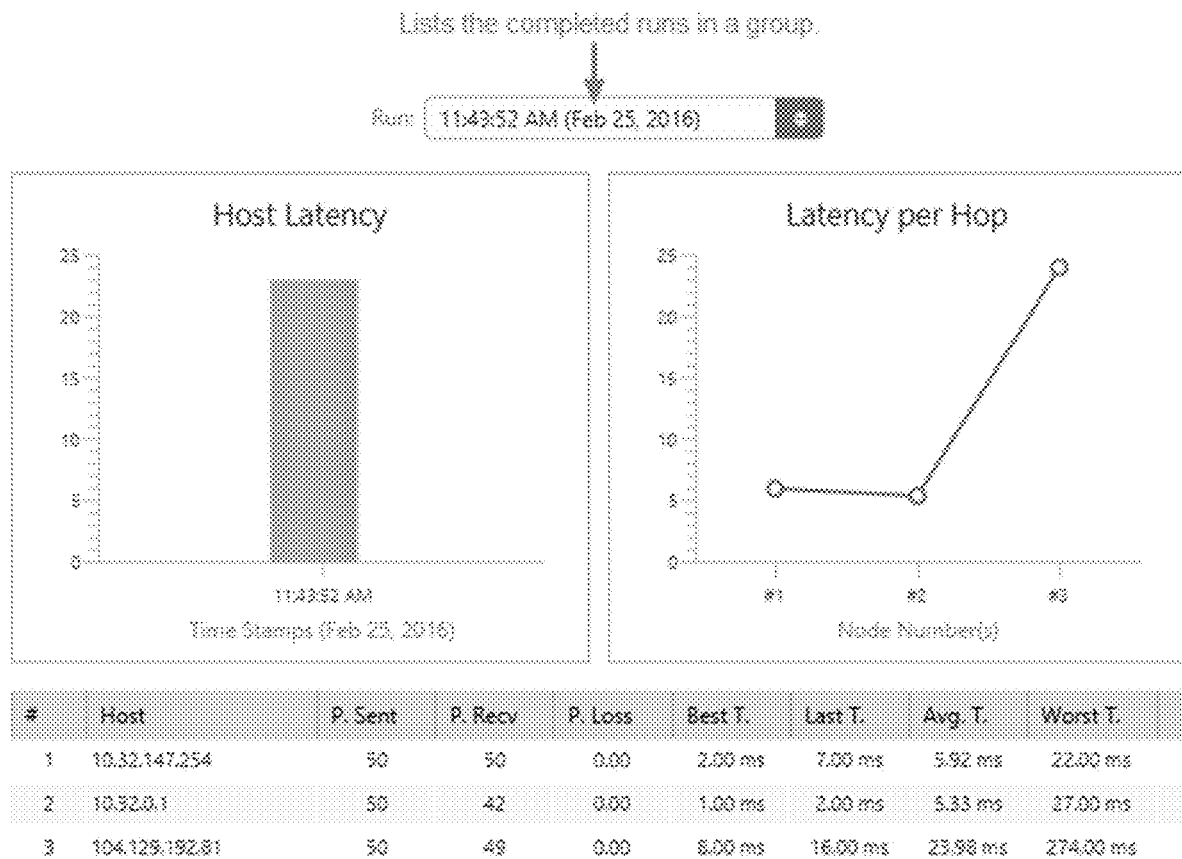
FIG. 19 is a GUI of test results in the analyzer app.

FIG. 19 illustrates a GUI of test results. If analyzer app 604 is configured to perform multiple runs, the results can be viewed for each completed run in the group by selecting it from the results list, as shown in FIG. 19. The Host Latency widget shows the latency that occurred when the device reached the cloud-based service 608. The Latency per Hop widget shows the latency for each intermediate network hop. The results table provides an overview of the results. It shows the following: #: Hop number; Host: IP address of the intermediate host; P. Sent: The number of packets sent to the intermediate host; P. Recv: The number of packets sent back by the host; P. Loss: Percentage of packet loss; Best T.: Smallest latency of all tests in seconds; Last T.: Latency of the last packet sent; Avg. T.: Average latency; and Worst T.: Highest latency of all tests.

The results can be exported to the analyzer service 602, such as file a CSV file with a filename similar to za_results_12_15_2015_12_56_53_PM_PST. The following is the information displayed for each group (repetitions of the same test) in the CSV file: Result Import Time: Time of the data export; ZA Version: Version number of the app; Group Number: Group ID; ZA Settings: The defined settings for the test; Host: Name of the host from which the test was run; Internal Source IP: Local IP address of the device; Public Source IP: Public IP address of the outbound traffic; Protocol: Protocol selected for the test; and Number of Runs: Number of tests run. The following is the information displayed for each run inside a group: Run Number: Run ID; Start Time: Time when the test started; End Time: Time when the test ended; Test Finished in: Duration of the test; and SNo: Results of the test for each intermediate host. The Results of the test for each intermediate host can include Host: IP address of the intermediate host; Longitude: GeoIP coordinate of the intermediate host; Latitude: GeoIP coordinate of the intermediate host; Location Name: GeoIP country of the intermediate host; Packet Sent: Number of packets sent to the intermediate host; Packet Received: Number of packets sent back by the host; Loss: Number of packets lost; Last Time: Latency of the last packet sent; Best Time: Smallest latency of all tests; Worst Time: Highest latency of all tests; Avg Time: Average latency; and St Dev: Standard deviation.

§ 9.3 Webload

Figure 20:
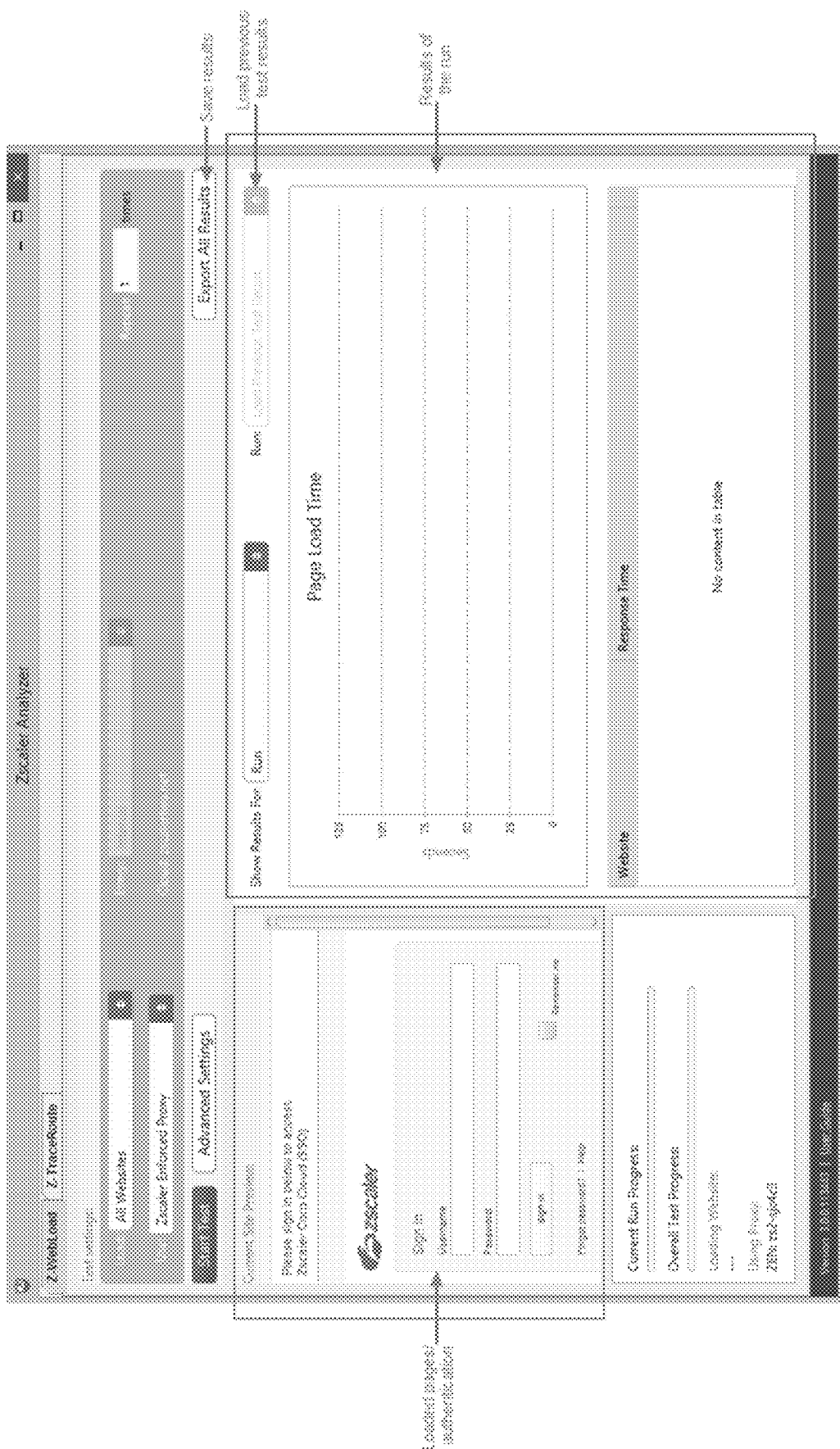
FIG. 20 is a GUI of the webload in the analyzer app.

FIG. 20 illustrates a GUI of the webload in the analyzer app 604. Here, there is a current site preview. The webload allows the analyzer app 604 to analyze the time it takes for a browser to load a web page, to detect potential issues. The analyzer app 604 performs a web page load test, and the results provide all the information needed to debug issues quickly. Depending on the environment, the analyzer app 604 can compare the load time through the cloud-based service 608 and the load time going directly to the Internet. The analyzer app 604 can be run multiple times at different intervals, for a more comprehensive view of the network.

The settings in the webload can include load, run frequency, and use. The load can set how many times the analyzer app 604 loads a Uniform Resource Locator (URL). For example, the analyzer app 604 can test up to ten URLs at a time. The analyzer app 604 can provide a default list of URLs to run and the URLs can be selected one, a subset, or all. The advanced settings can be used to remove or add a URL.

For the run frequency, the analyzer app 604 can run automatically at different intervals. For the use, the Page Load Time widget provides different results depending on the environment when the analyzer app 604 is run. If the traffic is going through the cloud-based service 608 when the analyzer app 604 starts, the analyzer app 604 is running through a proxy. If the user is not authenticated to the service, the user may be asked to authenticate when the analyzer app 604 is first opened. The authentication page is displayed in the Current Site Preview on the left in FIG. 14.

Figure 21:
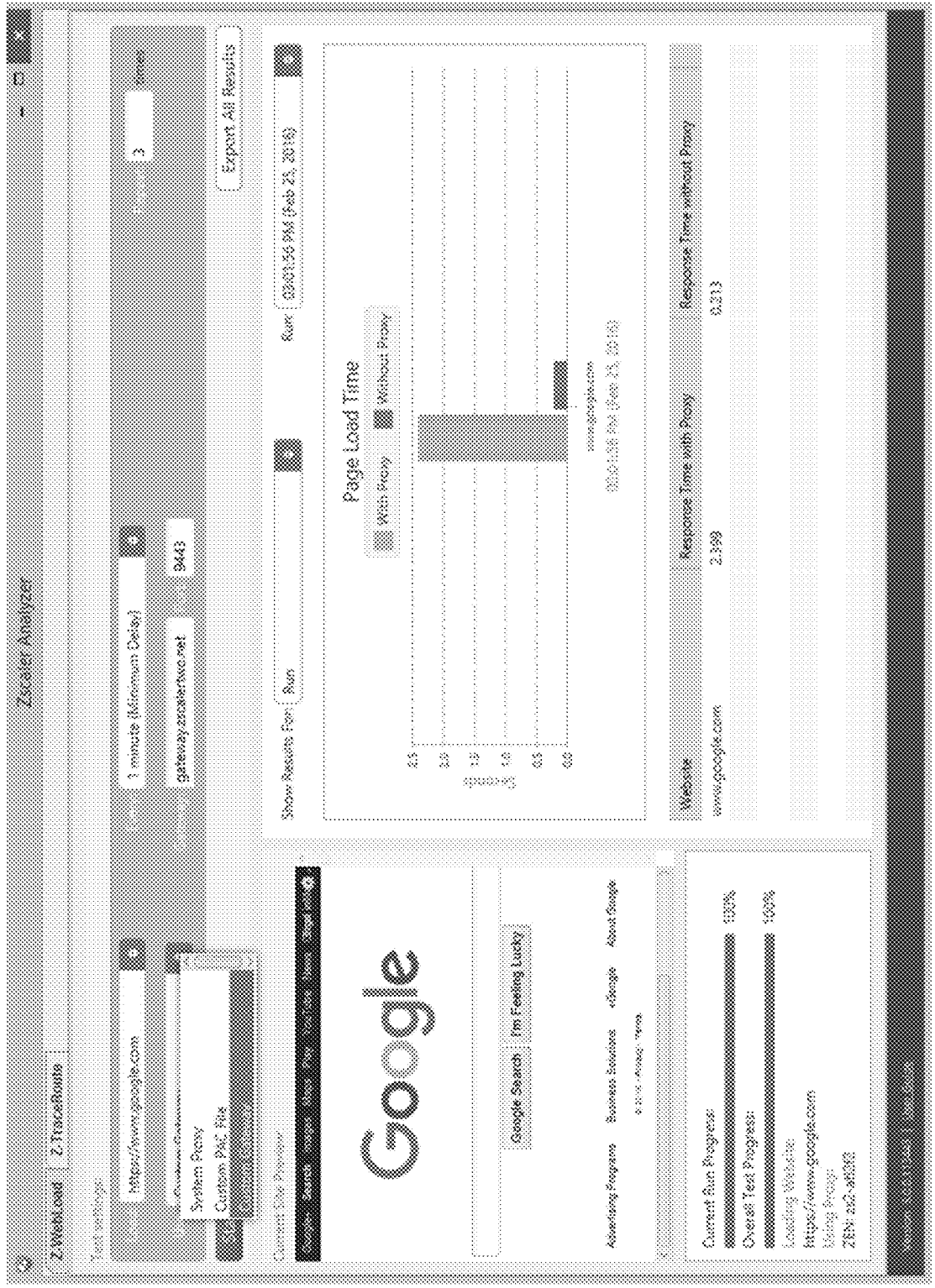
FIG. 21 is a GUI of the webload after selecting the custom gateway and providing results for page load time.

If your traffic is not going through the cloud-based service 608 when the analyzer app 604 starts, the following options can be chosen in a list, namely system proxy, custom PAC (Proxy Auto Config) file, custom gateway. FIG. 21 illustrates a GUI of the webload after selecting the custom gateway and providing results for page load time. The system proxy is chosen to use browser settings. For example, if the user device 606 is configured for the browser to use a PAC file or the cloud-based system 608, the analyzer app 604 will use those settings. The custom PAC file is chosen to use a PAC file to forward traffic to the cloud-based system 608. For example, the cloud-based system 608 can include hosts default PAC files which are configured to automatically forward all browser traffic to the nearest cloud node 150. The custom gateway is chosen to specify a node 150 to forward traffic. To specify a cloud node 150, enter the following: gateway.<cloud_name> and the port number.

Figure 22:
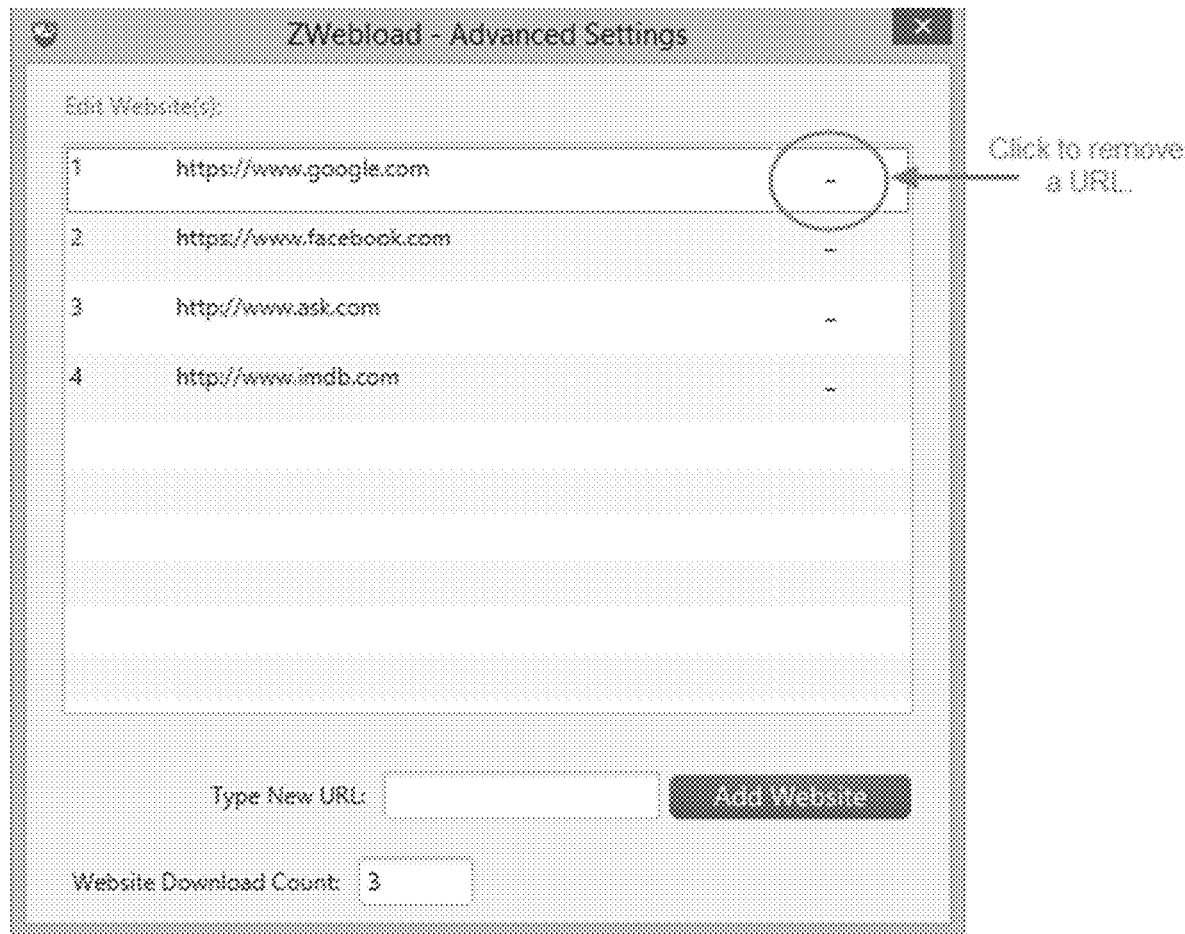
FIG. 22 is a GUI for advanced settings of the webload in the analyzer app.

If the custom PAC file or custom gateway is chosen, the user will be prompted to authenticated prior to the start of the test, such as in the current site preview. The results table can provide results in the following categories: With Proxy: the traffic is going through the cloud-based service 608 and Without Proxy: the traffic is not going through the cloud-based service 608. FIG. 22 is a GUI for advanced settings of the webload in the analyzer app 604. Here, websites can be added/removed, and download counts can be set.

Figure 23:
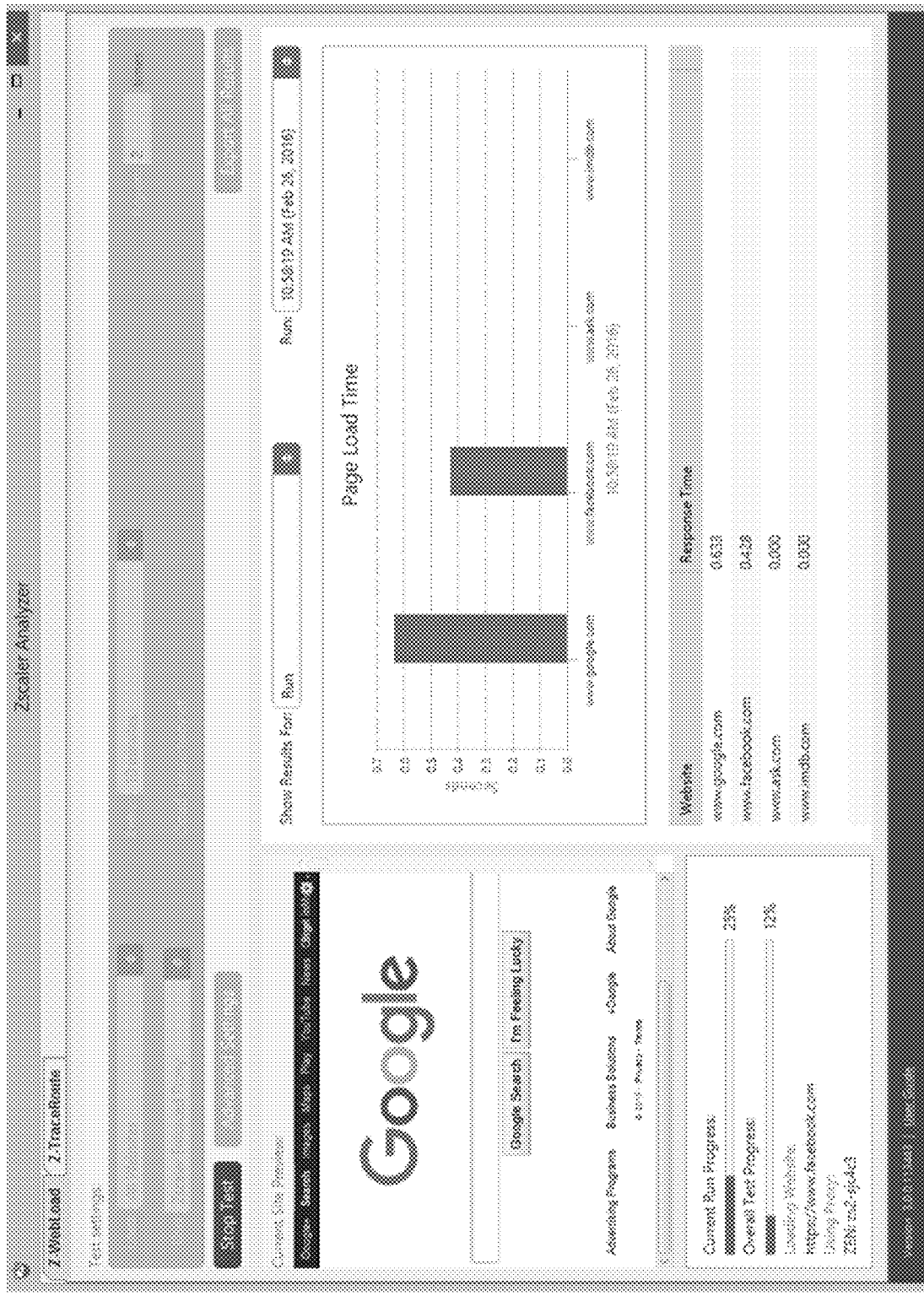
FIG. 23 is a GUI of the webload in the process of a test.
Figure 24:
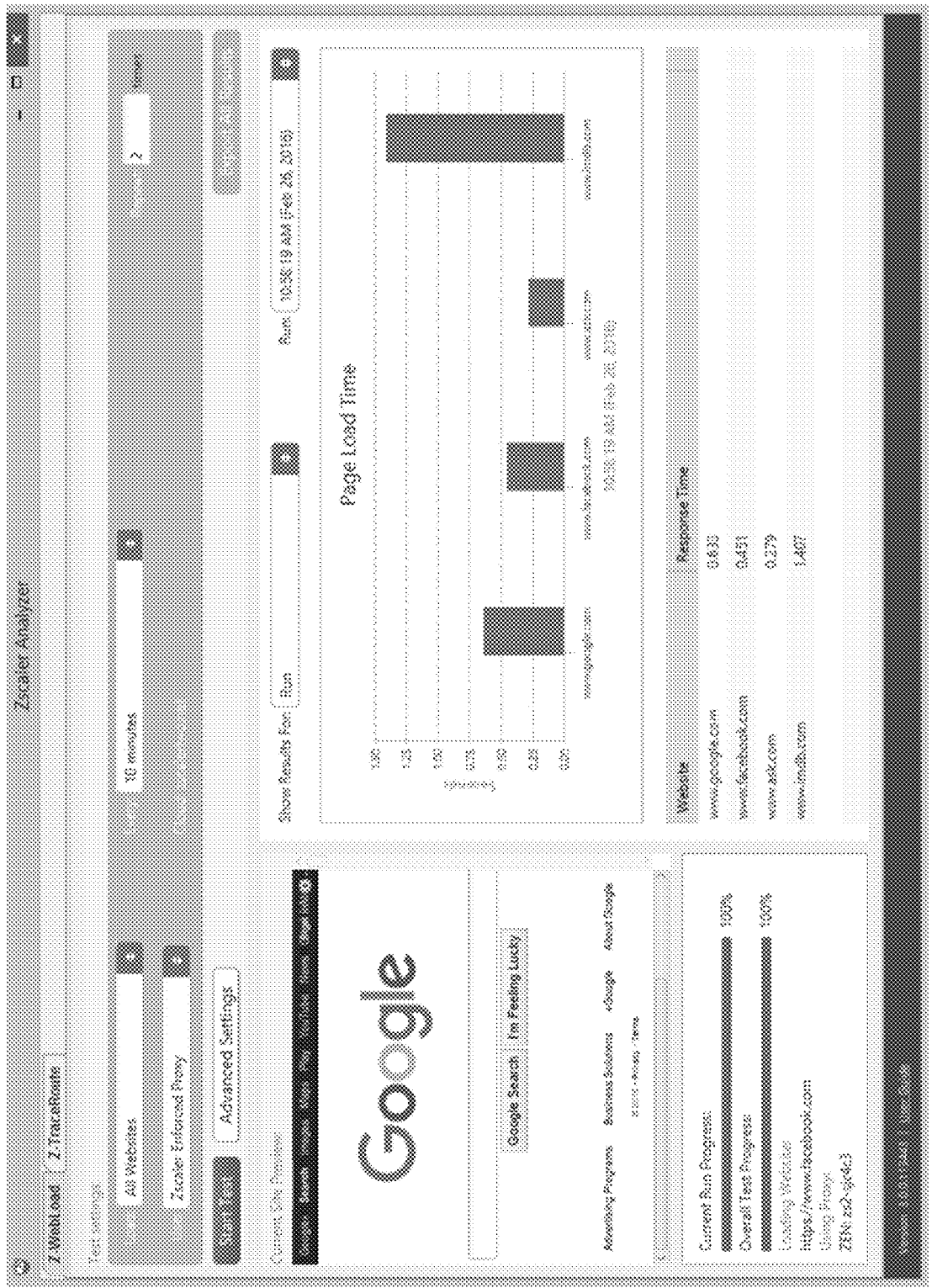
FIG. 24 is a GUI of the results of the webload from the process of FIG. 23.
Figure 25:
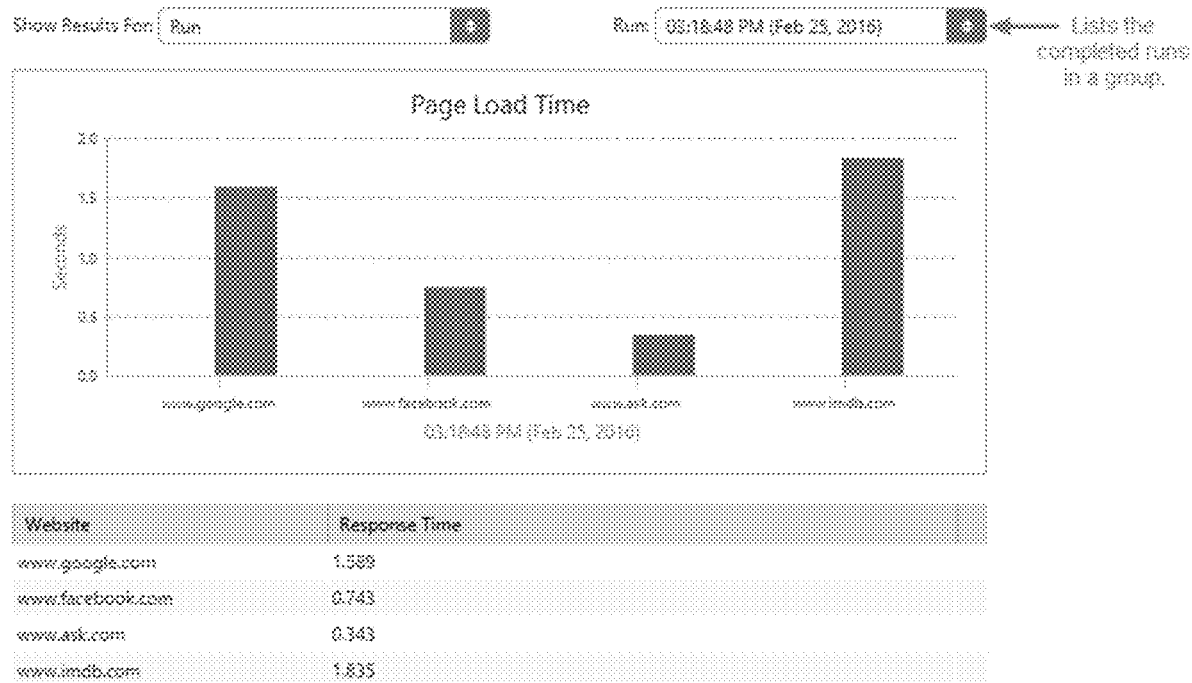
FIG. 25 is a view of the results from the webload.
Figure 26:
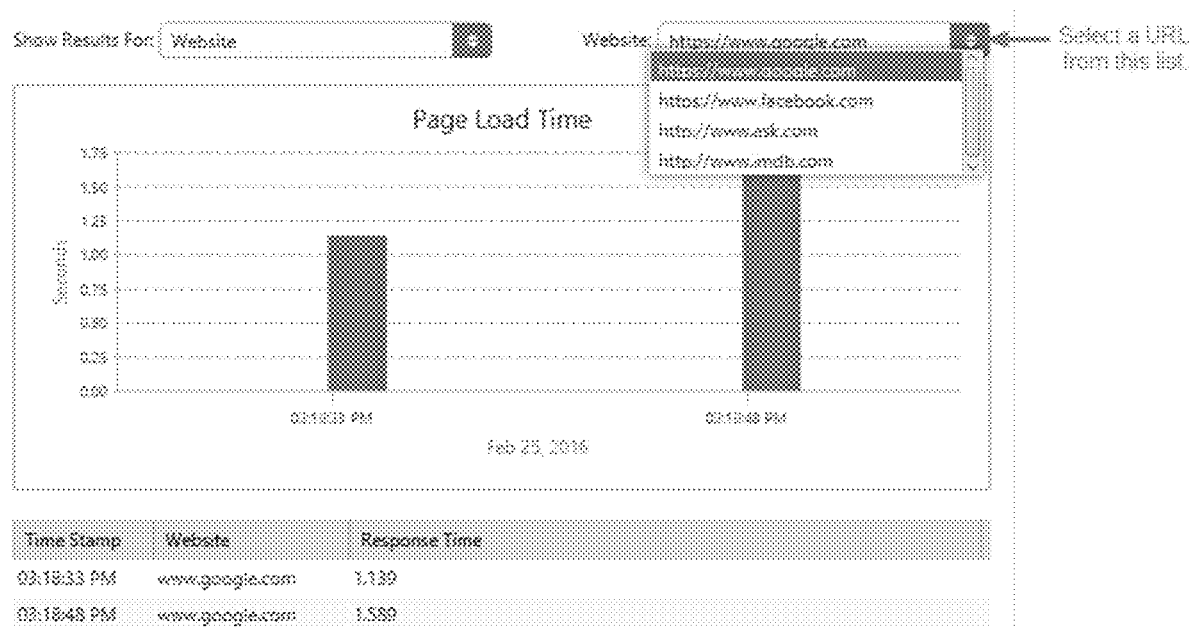
FIG. 26 is a view of the results for a single URL from multiple tested URLs from the webload.

FIG. 23 illustrates a GUI of the webload in the process of a test and FIG. 24 illustrates a GUI of the results of the webload from the process of FIG. 25. FIG. 25 illustrates a view of the results. If the analyzer app 604 has performed multiple runs, the results can be viewed for each completed run in the group by selecting it from the results list, as shown in FIG. 25. FIG. 26 illustrates a view of the results for a single URL from multiple tested URLs. If the analyzer app 604 was configured to test multiple URLs, the results can be viewed for each URL by clicking or selecting each URL as shown in FIG. 20. The Page Load Time widget shows how long it took the browser to load a web page. The results table provides an overview of the results. It shows the following: Time Stamp: The time when the test started, Website: The tested URL, and Response Time: The average time it took the browser to load the main web page.

When the analyzer app 604 completes all the configured runs for the webload, the analyzer app 604 can export the results. The following is the information displayed for each group (repetitions of the same test): Result Import Time: Time of the data export; Tool Version: Version number of the app; Group Number: Group ID; WebLoad Settings: The defined settings for the test; Number of Runs: Number of tests run; Proxy Type: Name of the proxy from which the test was run; Gateway Name: Name of the gateway from which the test was run; Gateway IP: IP address of the gateway from which the test was run; and CN: The cloud node from which the test was run.

The following is the information displayed for each run inside a group: Run Number: Run ID; Start Time: Time when the test started; End Time: Time when the test ended; Test Finished in: Duration of the test; and SNo: Results of the test for each immediate host. The results for each intermediate host can include URL: The tested URL; URL IP: IP address of the URL tested; Load Count: The number of times the URL was repeated; Response Code: The HTTP response code for successful or failed requests; DNS Time: The time it took client to contact DNS server; Connect Time: The time it took browser to connect to the server; and Full Page Time: The time it took the browser to load the entire web page and all its assets, such as images, scripts, etc.

Figure 27:
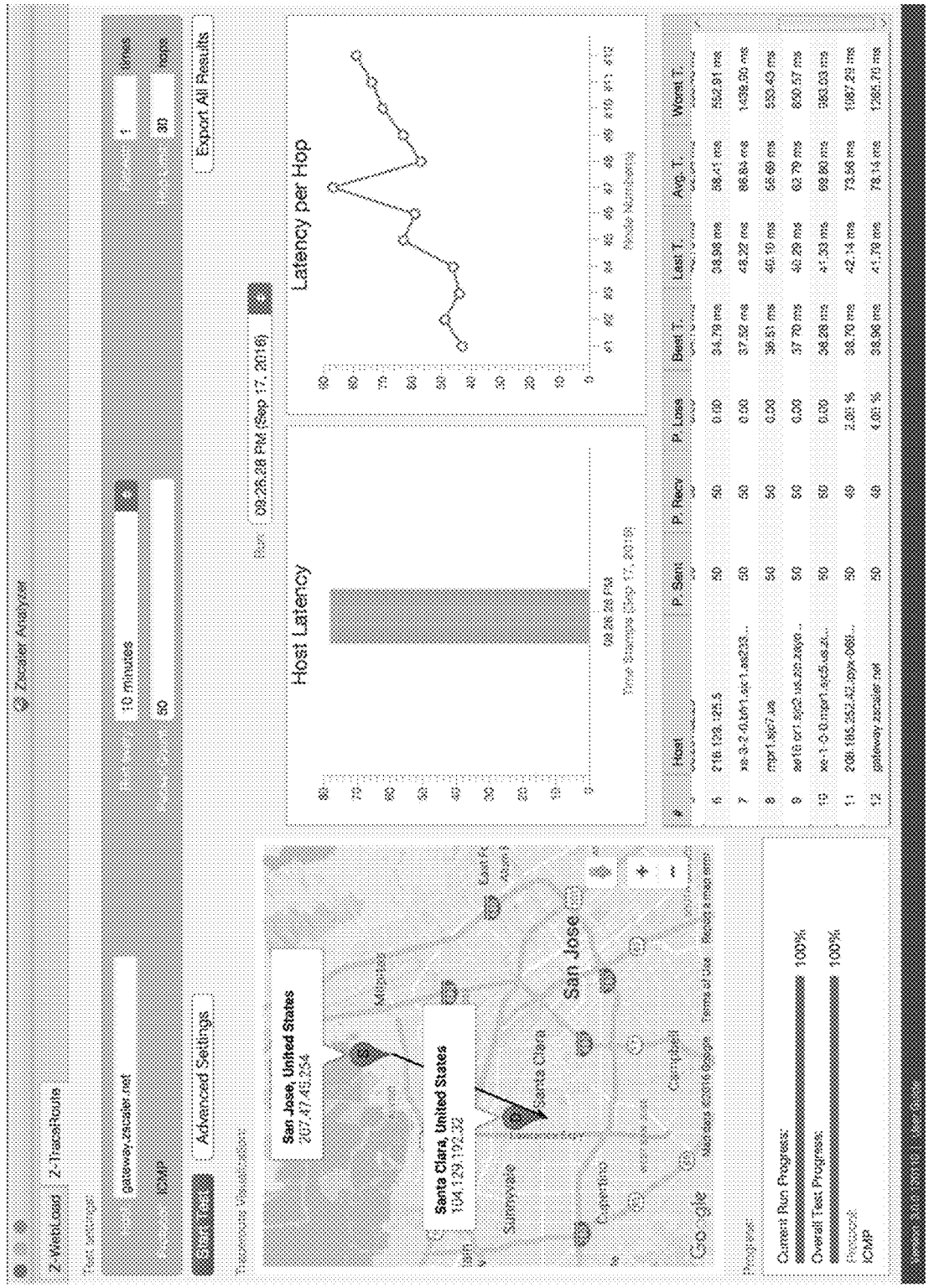
FIG. 27 is a GUI of another example implementation of the MTR.
Figure 28:
FIG. 28 is a GUI of another example implementation of the webload.
Figures 29, 30:
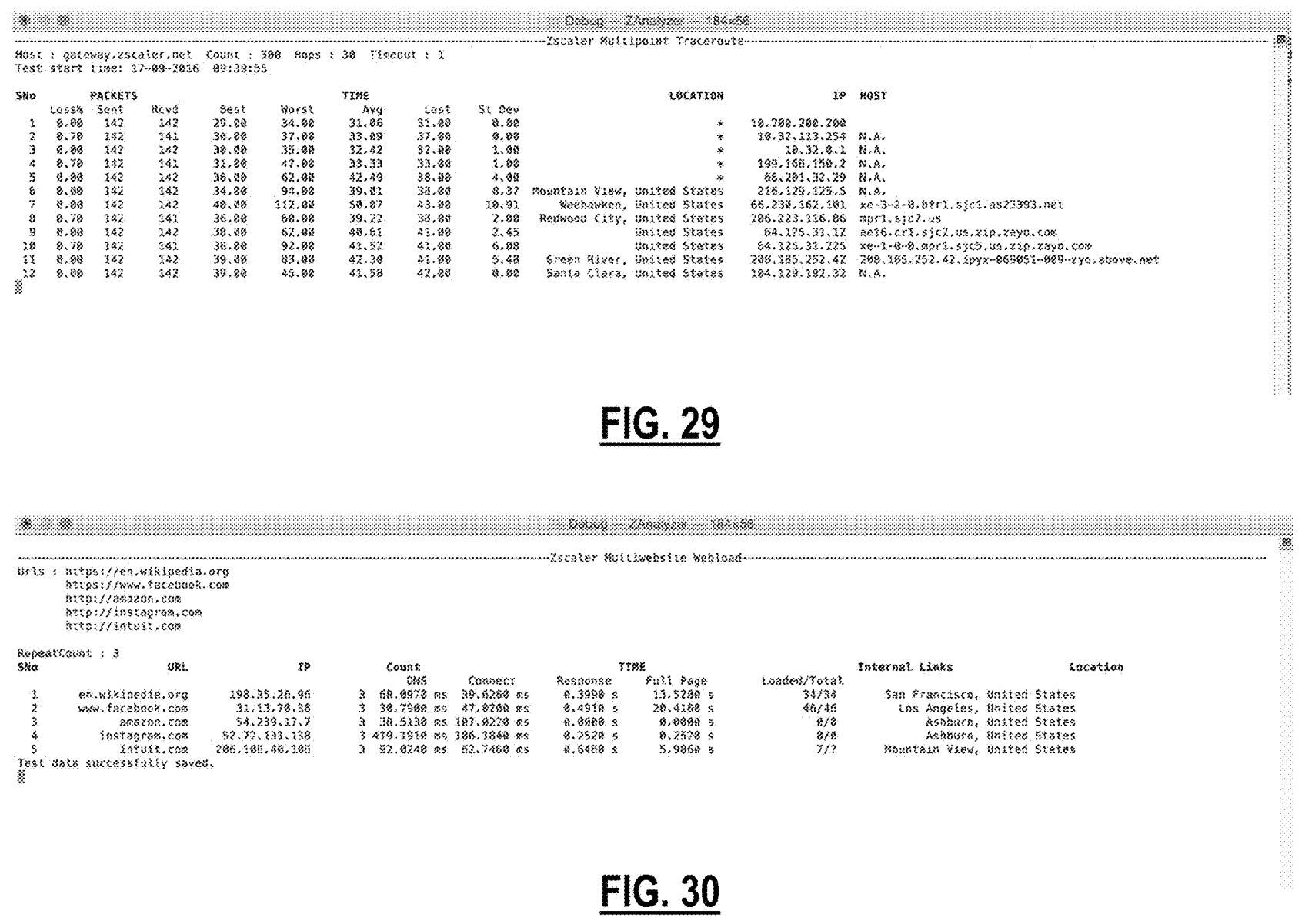

FIGS. 27-28 illustrate GUIs for another example implementation of the MTR (FIG. 27) and the webload (FIG. 28). FIGS. 29-30 illustrate results from the example implementation of the MTR of FIG. 27 (FIG. 29) and the webload of FIG. 28 (FIG. 30). As can be seen in the results, detailed information is captured.

§ 9.4 Method for Troubleshooting and Performance Analysis

Figure 31:
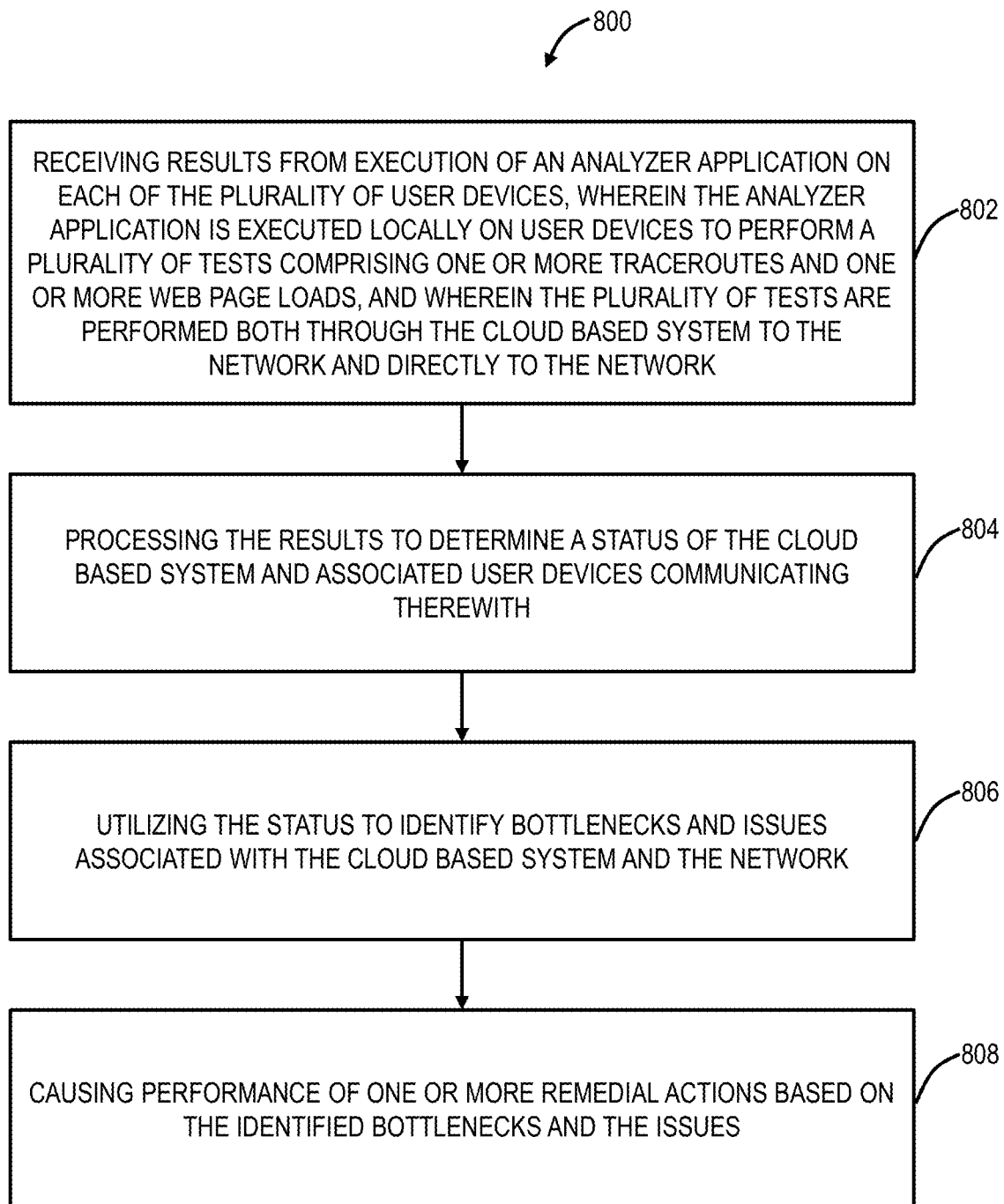
FIG. 31 is a flowchart of a method for troubleshooting and performance analysis of a cloud-based system.

FIG. 31 is a flowchart of a method 800 for troubleshooting and performance analysis of a cloud-based system. The method 800 is implemented by an analyzer service executed on one or more servers, and the analyzer service is communicatively coupled to a network and to a plurality of user devices. The method 800 includes receiving results from execution of an analyzer application on each of the plurality of user devices, wherein the analyzer application is executed locally on user devices to perform a plurality of tests including one or more traceroutes and one or more web page loads, and wherein the plurality of tests are performed both through the cloud-based system to the network and directly to the network (step 802); processing the results to determine a status of the cloud-based system and associated user devices communicating therewith (step 804); utilizing the status to identify bottlenecks and issues associated with the cloud-based system and the network (step 806); and causing performance of one or more remedial actions based on the identified bottlenecks and the issues (step 808).

The method 800 can further include receiving results from execution of an analyzer application on the cloud-based system which corresponds to the results from the associated analyzer application executed locally on the associated user device. The method 800 can further include causing the execution of the analyzer application on a particular user device responsive to a troubleshooting notification associated with the particular user device. The traceroutes can include a My Traceroute (MTR) and the web page loads load one or more Uniform Resource Locators (URLs) either through a system proxy, a custom PAC (Proxy Auto Config) file, and a custom gateway. The traceroutes detect host latency and latency per hop in the network and the web page loads detect a response time for loading one or more Uniform Resource Locators (URLs). The one or more remedial actions can include causing maintenance on the user device based on misconfigurations, out-of-date software, and hardware deficiencies; causing maintenance on the network based on misconfigurations and hardware deficiencies; and causing maintenance on the cloud-based system based on misconfigurations and hardware deficiencies The method 800 can further include monitoring the results over time; and processing the monitored results over time to determine upgrades in network capacity, processing capacity, and geographic locations of the cloud-based system. The results can include geographic location of the user devices and associated nodes in the cloud-based system, processing latency introduced by the cloud-based system, response time, application performance in the cloud-based system, and service availability of the cloud-based system. The cloud-based system can include a distributed security system monitoring and protecting the user devices from a plurality of security threats, wherein the distributed security system provides in-line protection of the user devices, independent of device type, hardware configuration, operating system, geographic location, and physical network location.

In another embodiment, a cloud-based system configured for troubleshooting and performance analysis thereof includes one or more cloud nodes executed on one or more servers and communicatively coupled to a plurality of user devices via a network for cloud access; and an analyzer service executed on one or more servers and communicatively coupled to the one or more cloud nodes and the plurality of user devices, wherein the analyzer service is configured to receive results from execution of an analyzer application on each of the plurality of user devices, wherein the analyzer application is executed locally on user devices to perform a plurality of tests including one or more traceroutes and one or more web page loads, and wherein the plurality of tests are performed both through the cloud-based system to the network and directly to the network; process the results to determine a status of the cloud-based system and associated user devices communicating therewith; utilize the status to identify bottlenecks and issues associated with the cloud-based system and the network; and cause performance of one or more remedial actions based on the identified bottlenecks and the issues.

In a further embodiment, a user device configured for troubleshooting and performance analysis of a cloud-based system includes a network interface communicatively coupled to a network, a data store, and a processor communicatively coupled to one another; and memory storing computer executable instructions, and in response to execution by the processor, the computer-executable instructions cause the processor to access the cloud-based system for one or more functions therewith; execute an analyzer application to perform a plurality of tests including one or more traceroutes and one or more web page loads, and wherein the plurality of tests are performed both through the cloud-based system to the network and directly to the network; and transmit the results to an analyzer service which processes the results to determine a status of the cloud-based system and associated user devices communicating therewith, wherein the analyzer service utilizes the status to identify bottlenecks and issues associated with the cloud-based system and the network and causes performance of one or more remedial actions based on the identified bottlenecks and the issues.

§ 9.5 Use of the Analyzer Service

As described herein, outputs and reports from the analyzer service 602 can be used to troubleshoot individual user problems. Additionally, the outputs and reports can be used to develop a historical view of the cloud-based system 100 for upgrades, network planning, etc. In an example embodiment, the outputs and reports can be collected over time and used to predict network congestion in advance enabling the cloud operator an opportunity to intelligently address the predicted network congestion. This collected data over time can be analyzed using Big Data predictive learning techniques. For example, with thousands or even millions of users executing the analyzer app 604, there is a vast amount of historical data collected and analyzed by the analyzer server 602. The predictive learning techniques can comb this data to discover patterns in the data including relationships that can be used for prediction of network congestion.

The cloud-based system 100 can also be proactively maintained by monitoring performance trends and extrapolation using statistical/machine learning techniques from the analyzer service 602. One example aspect can include optimizing cloud data center selection for better performance by using what-if-scenario analysis. All these use case scenarios are possible from the collected measurement data for each run of the analyzer service 602 in the cloud. In an embodiment, the analyzer service 602 can use MongoDB for data management which is compatible with and is a component of a Big Data technology stack.

§ 10.0 Web Probes

As described herein, a web probe is used to collect metrics associated with a web page, such as page fetch time, Domain Name Server (DNS) time, server response time, availability, etc. In a large-scale deployment, there can be a surge or excessive amount of traffic served on a destination server that can cause possible blocking (e.g., in a block list) or filtering of traffic. Web probes are HTTP-based probes used to measure website performance for a device for determining metrics for downloading a Uniform Resource Locator (URL). The metrics can include, for example, DNS resolve times, TCP connect times, SSL handshake time, page size, site availability, transfer type (Content-length/Chunked), Time to first byte (TTFB), and the Time to last byte (TTLB).

§ 11.0 Deep Tracing

As the workplace shifts, a company (tenant) can have distributed offices, employees working from home, road warriors, etc. Network slowdown is a common issue. IT does not have visibility of users 102 who are not within the enterprise network. The various techniques described herein for digital user experience can be used for deep tracing to detect and correct ant issues. The deep tracing feature provides admins the ability to actively troubleshoot a subset of devices 300 by collecting web page and trace metrics more frequently (every minute) and provide more details on system resource consumption, path trace hops beyond what User Details page provides currently. In addition, admins will have the ability to collect packet captures during the deep tracing session.

Deep tracing can be implemented on a subset of users 102 for a given organization/tenant. For example, IT support can implement deep tracing responsive to a service call. The duration of a deep tracing session can be a set or small period of time, i.e., it is not ongoing monitoring as described herein, but focused monitoring to troubleshoot a specific issue. A deep tracing session can be started against a single application or to collect device system metrics or both. For a deep tracing session against an application, the admin can pick different monitors and timing. The monitors can be web probes or traces to the application, to arbitrary destinations or domains, and the like. The deep tracing session also collects statistics at the user device 300. Thresholds can be set for packet loss and/or latency metrics to highlight when these thresholds are exceeded in the traceroute timeline in the deep tracing view.

The deep tracing session is performed via a combination of the cloud-based system 100, the user device 300, the application 350, and/or the browser add on. Also, this can include the user device 606, the analyzer apps 604, 610, and the cloud-based service 608. Specifically, an admin can request a deep tracing session through the cloud-based system 100 and it can be implemented on the user device 300. The user device 300 can use the application 350 and/or the browser add on to perform various measurements and report to the cloud-based system 100. A deep tracing session should only be allowed for active devices 300, relative to the cloud-based system 100.

Once a deep tracing session is initiated, the application 350 will collect metrics based on selected options, periodically, e.g., every minute or some other value. The options can be web probes, trace probes, system measurements, etc. The deep tracing session will collect process level information for device metrics, top consuming processes by CPU, mem, diskIO, netIO, etc.

A UI viewer can display top process information. Detailed view of traceroute for all hops can be shown when clicking on each leg. The following functionality is needed: Search for a hop by IP, Internet Service Provider (ISP) name, Country or Autonomous System Name (ASN), which expands and highlights the found hop (if any), and a need to start collecting ISP, Country and ASN information for traceroute hops.

§ 11.1 Deep Tracing UI

Figure 33:
Figure 34:
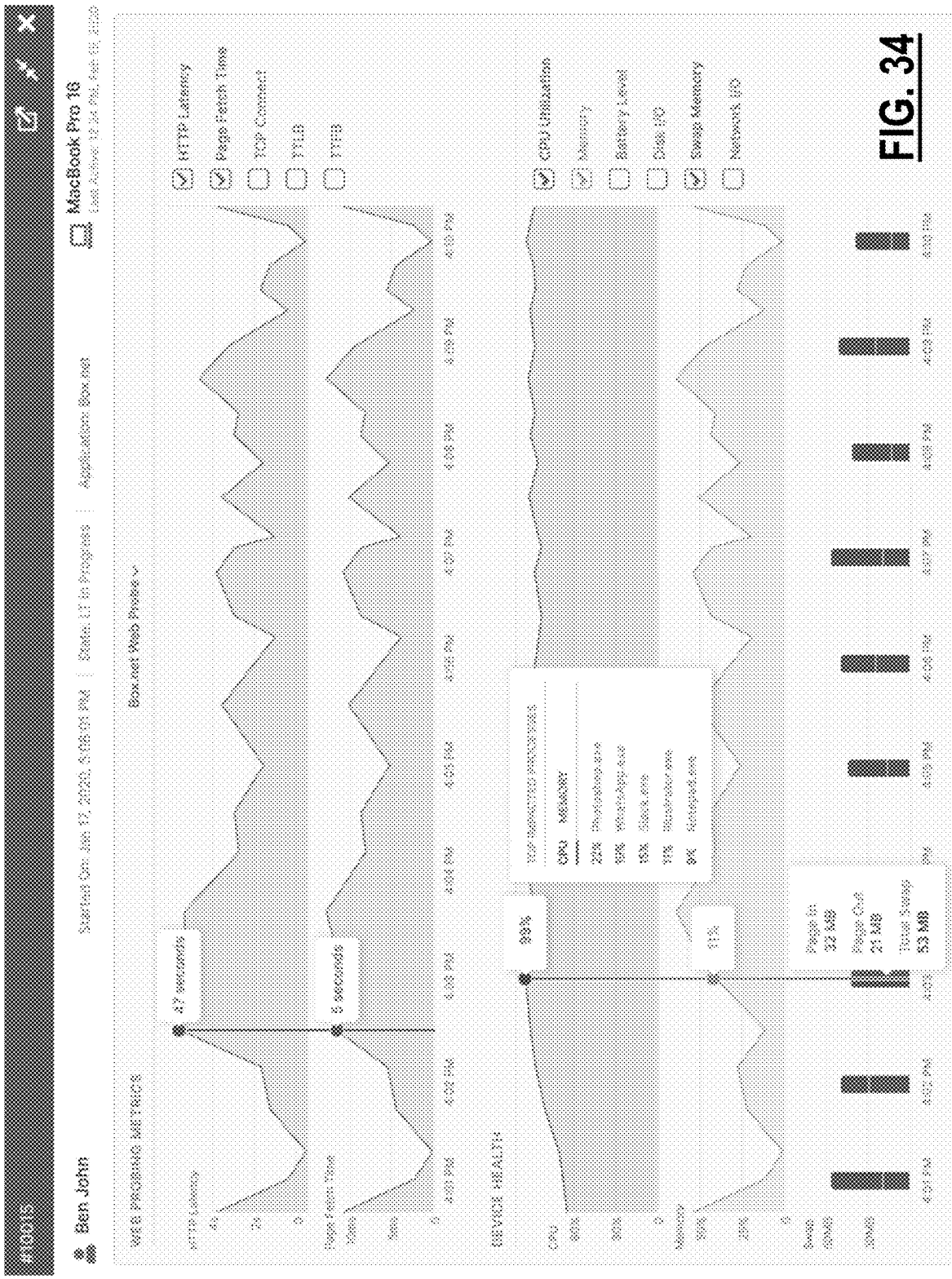
Figure 35:
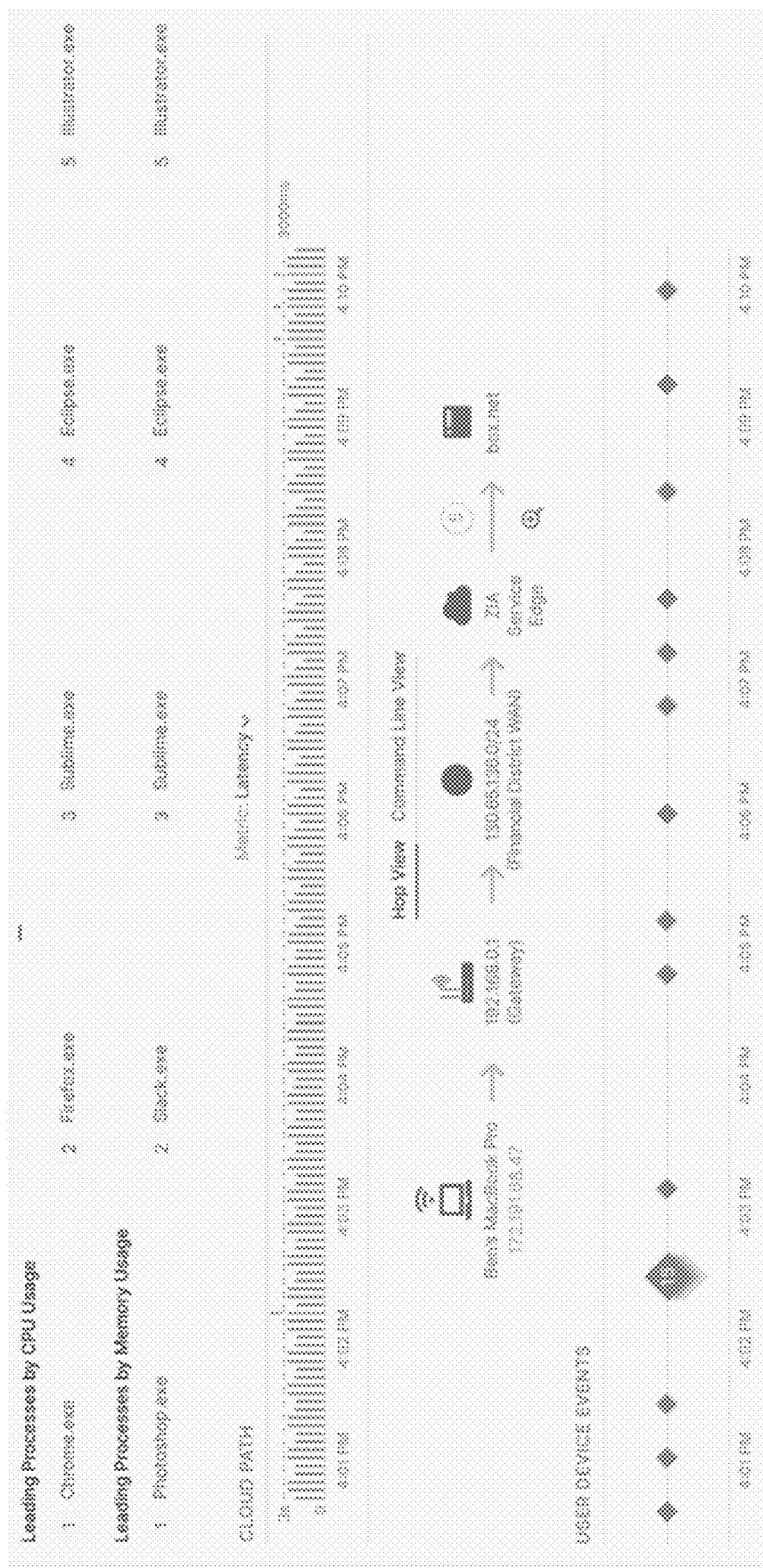

FIGS. 32-35 are screenshots associated with the deep tracing. FIG. 32 is a screenshot of in progress and completed deep tracing sessions. FIG. 33 is a screenshot of a pop up screen for starting a new deep tracing session. FIG. 34 is a screenshot of graphs of a completed/running deep tracing session. FIG. 35 is a screenshot of the path and events for the completed/running deep tracing session.

Triggered deep tracing sessions are viewed and managed in the UI of FIG. 32, that displays currently running sessions with ability to view status (Initiated, Running, Cancelled, Failed/Error, Expired, Done). Completed sessions are displayed in a separate History section, up to 30 days; drill-in on live view; cancel a session; clone a session (to re-run); Start and end timestamps; and the like.

The graphs, path, and events in FIGS. 34 and 35 can include live updating (auto-refresh) detailed view which is an extended view of the User Details screen in context of single device/app covering the duration of the deep tracing session. The graphs can include Web Metric charts (1 chart per metric), page fetch time, DNS, Time to First Byte (TTFB), etc.; Device health charts (1 chart per metric); Top processes table (top N) (if selected) w/CPU, mem, diskIO, netIO, etc. FIG. 35 can include Detailed Traceroute view, start with summary and click on each leg to expand the hops, text view of traceroute (same as MTR or traceroute output), Device Event view, etc.

§ 11.2 Example Deep Tracing

Figure 36:
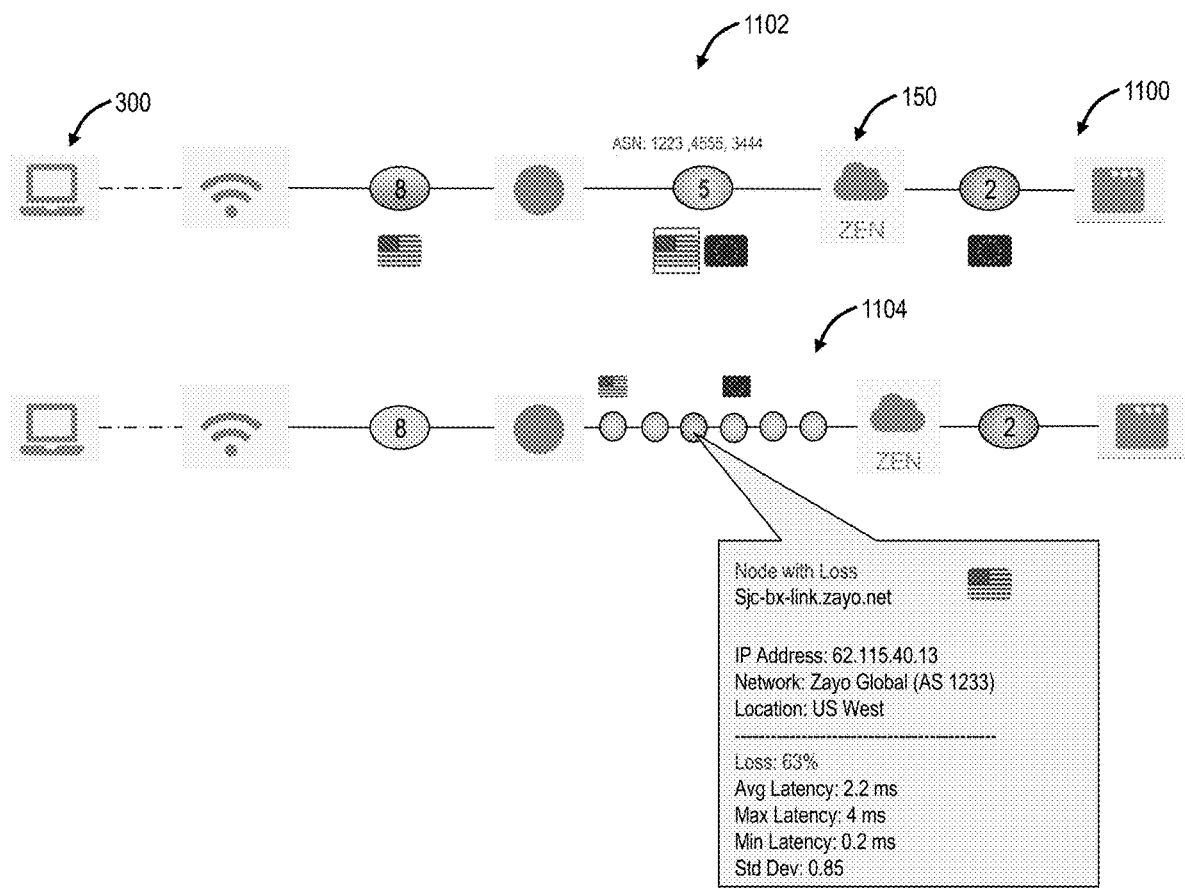
FIG. 36 is a diagram of an example deep tracing session.
Figure 37:
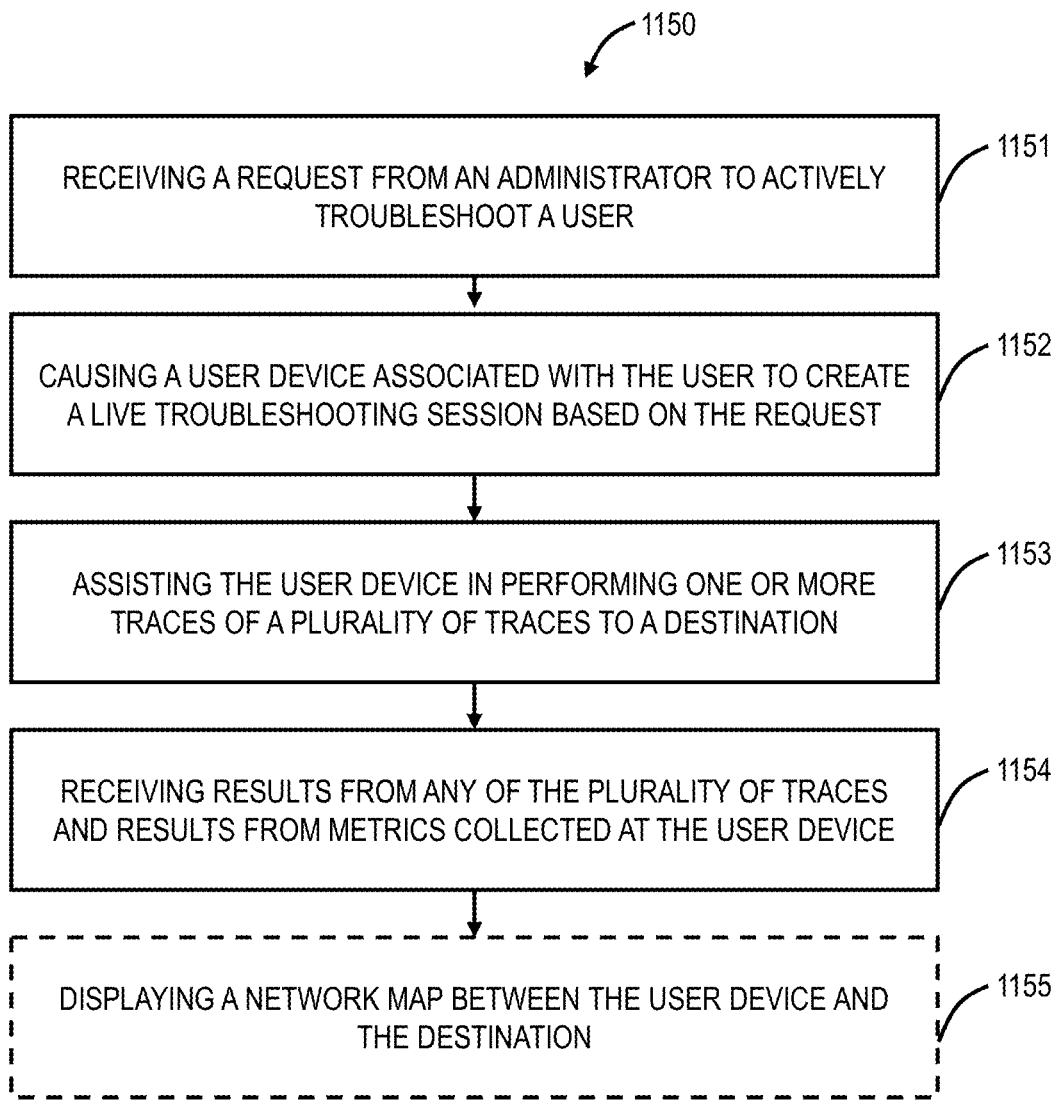
FIG. 37 is a flowchart of a process implemented by a server for deep tracing for troubleshooting of users.

FIG. 36 is a diagram of an example deep tracing session. FIG. 36 is presented for determining where there is a problem between a user device 300, intermediate nodes and links, a node 150, and a destination 1100. First, a summary view 1102 is presented of user details page, carry over same diagram and information, with addition of groups of hops in each leg. The hop group displays number of hops in each group. Each group has a specific color to distinguish from each leg. Groups with issues are highlight in red. Each group has country flags, if there are multiple countries display multiple flags. A user can expand each group 1104 and drill down to the hop view which shows small circles. Red circles are hops with issues. Tooltip pop up display to show details about the hop including ASN and ISP.

§ 11.3 Integration with Incident Management Systems

The deep tracing can be integrated with incident management systems, e.g., ServiceNow. The deep tracing can send summary data to the incident management system. Also, the incident management system can trigger the deep tracing. Also, after a deep tracing session ends, an admin can send to the incident management system and create a ticket from the session viewer.

§ 11.4 Deep Tracing Process

FIG. 47 is a flowchart of a process 1150 implemented by a server for deep tracing of users 102. The process 1150 can be a computer-implemented method, implemented as instructions stored in a computer-readable medium and executed by one or more processors, or by an apparatus such as the node 150, etc.

The process 1150 includes receiving a request from an administrator to actively troubleshoot a user (step 1151); causing a user device associated with the user to create a deep tracing session based on the request (step 1152); assisting the user device in performing one or more traces of a plurality of traces to a destination (step 1153); receiving results from any of the plurality of traces and results from metrics collected at the user device (step 1154); and displaying a network map between the user device and the destination (step 1155).

The destination can include an application, and wherein the one or more traces can include any of traceroute and web probes. The network map can display any of hop Internet Protocol (IP) address, Internet Service Provider (ISP) data, country data, and Autonomous System Name (ASN) data. The network map can include groupings of nodes including visualizations of status. The process 1150 can further include expanding the groupings responsive to a selection. The process 1150 can further include providing data from the deep tracing session to an incident management system. The network map can include icons for the user device, the cloud-based system, the destination, and any intermediate nodes.

The deep tracing process can include both tests (e.g., traces, web probes, packet capture, etc.) as well as collection of statistics at the user device (e.g., local device data, active processes on the device, software inventory, speed tests, etc.). The deep tracing process treats remote IT admin as if they were logged into the user device 300, for the purpose of measuring user experience. Also, the deep tracing process can either 1) troubleshoot devices online now or 2) schedule a session at any point in time (schedule at time)—device is offline at—run when the device comes online.

§ 12.0 Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

The foregoing sections include headers for various embodiments and those skilled in the art will appreciate these various embodiments may be used in combination with one another as well as individually. Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of deep tracing of one or more users via a cloud-based system, the method comprising steps of:
   receiving a request from an administrator through the cloud-based system to actively troubleshoot any of a user and a group of users;
   causing one or more user devices associated with one or more users to create a deep tracing session based on specified options in the request;
   assisting the one or more user devices in performing one or more tests of a plurality of traces to a destination and collecting a plurality of statistics associated with the one or more user devices, wherein the deep tracing session is performed via a combination of any of the cloud-based system, the one or more user devices, an application executing on the one or more user devices, and a browser add on;
   receiving results from any of the plurality of tests and results from the plurality of statistics and
   displaying a network map between the one or more user devices and the destination.

2. The method of claim 1, wherein the destination includes an application, and wherein the one or more traces include any of traceroute and web probes.

3. The method of claim 1, wherein the network map displays any of hop Internet Protocol (IP) address, Internet Service Provider (ISP) data, country data, and Autonomous System Name (ASN) data.

4. The method of claim 1, wherein the network map includes icons for the one or more user devices, the cloud-based system, the destination, and any intermediate nodes.

5. The method of claim 1, wherein the network map includes groupings of nodes including visualizations of status.

6. The method of claim 5, wherein the steps further include
expanding the groupings responsive to a selection.

7. The method of claim 1, wherein the steps further include
providing data from the deep tracing session to an incident management system.

8. The method of claim 1, wherein the one or more devices are offline and the specified options in the request cause the deep tracing session to begin when the one or more devices come online.

9. The method of claim 1, wherein the one or more devices are online and the deep tracing session is performed after the request.

10. A non-transitory computer-readable medium comprising instructions that, when executed, cause one or more processors to perform steps of:
receiving a request from an administrator through the cloud-based system to actively troubleshoot any of a user and a group of users;
causing one or more user devices associated with one or more users to create a deep tracing session based on specified options in the request;
assisting the one or more user devices in performing one or more tests of a plurality of traces to a destination and collecting a plurality of statistics associated with the one or more user devices, wherein the deep tracing session is performed via a combination of any of the cloud-based system, the one or more user devices, an application executing on the one or more user devices, and a browser add on;
receiving results from any of the plurality of tests and results from the plurality of statistics and
displaying a network map between the one or more user devices and the destination.

11. The non-transitory computer-readable medium of claim 10, wherein the destination includes an application, and wherein the one or more traces include any of traceroute and web probes.

12. The non-transitory computer-readable medium of claim 10, wherein the network map displays any of hop Internet Protocol (IP) address, Internet Service Provider (ISP) data, country data, and Autonomous System Name (ASN) data.

13. The non-transitory computer-readable medium of claim 10, wherein the network map includes icons for the one or more user devices, the cloud-based system, the destination, and any intermediate nodes.

14. The non-transitory computer-readable medium of claim 10, wherein the network map includes groupings of nodes including visualizations of status.

15. The non-transitory computer-readable medium of claim 14, wherein the steps further include
expanding the groupings responsive to a selection.

16. The non-transitory computer-readable medium of claim 10, wherein the steps further include
providing data from the deep tracing session to an incident management system.

17. The non-transitory computer-readable medium of claim 10, wherein the one or more devices are offline and the specified options in the request cause the deep tracing session to begin when the one or more devices come online.

18. The non-transitory computer-readable medium of claim 10, wherein the one or more devices are online and the deep tracing session is performed after the request.

19. The method of claim 1, wherein assisting the one or more user devices in performing one or more tests of a plurality of traces to a destination and collecting a plurality of statistics associated with the one or more user devices includes causing the application executing on each of the one or more user devices to collect metrics based on the request.

* * * * *